United States Patent [19]

Hayashi et al.

[11] Patent Number: 5,309,245
[45] Date of Patent: May 3, 1994

[54] IMAGE FORMING APPARATUS HAVING FUNCTION FOR FORMING COMPOSITE IMAGE

[75] Inventors: Masayuki Hayashi; Yasushi Kamo; Masaaki Ito, all of Yokohama, Japan

[73] Assignee: Ricoh Company, Ltd., Tokyo, Japan

[21] Appl. No.: 883,458

[22] Filed: May 14, 1992

[30] Foreign Application Priority Data

May 15, 1991 [JP] Japan .................................. 3-110413

[51] Int. Cl.⁵ ...................... H04N 1/387; H04N 1/44; G03B 27/52; G03G 21/00
[52] U.S. Cl. .................................... 358/296; 358/448; 358/450; 355/40; 355/244; 355/320; 355/323
[58] Field of Search ............... 358/296, 448, 450, 452; 395/117, 135, 150, 151, 145; 346/160; 355/202, 244, 82, 271, 40, 318, 319, 320, 323

[56] References Cited

U.S. PATENT DOCUMENTS

| | | |
|---|---|---|
| 4,334,765 | 6/1982 | Clark .................................. 355/244 |
| 4,845,525 | 7/1989 | Ito .................................... 355/244 X |
| 4,855,767 | 8/1989 | Sato et al. ............................ 346/160 |
| 4,896,208 | 1/1990 | Moriya et al. ................... 358/450 X |
| 5,126,858 | 6/1992 | Kurogane et al. ................... 358/450 |

Primary Examiner—Benjamin R. Fuller
Assistant Examiner—Eric Frahm
Attorney, Agent, or Firm—Mason, Fenwick & Lawrence

[57] ABSTRACT

An image forming apparatus includes a scanner for scanning a plurality of document so that n images corresponding to the documents are obtained, n being an integer greater than 2, an image generating means for successively generating m number images different from each other, m being an integer greater than 2, an image composition circuit for combining an i-th image (i=1, 2 ...., and n) obtained by the scanner and a j-th number image (j=1, 2 , ..., and m) with each other so as to output a composite image $I_{ij}$, a printing mechanism for printing the composite image $I_{ij}$ on a recording sheet, and an output unit for outputting the recording sheet having the composite image $I_{ij}$ formed thereon.

11 Claims, 22 Drawing Sheets

FIG. 22
| DESTINATIONS | MARK(ADDED NO.) |
|---|---|
| TOKKYO | 01 |
| EIGYO | 02 |
| SEIZO | 03 |
FIG. 23A
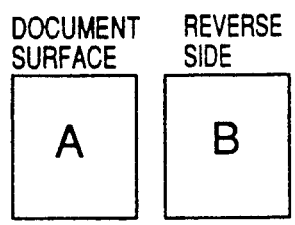
FIG. 23B
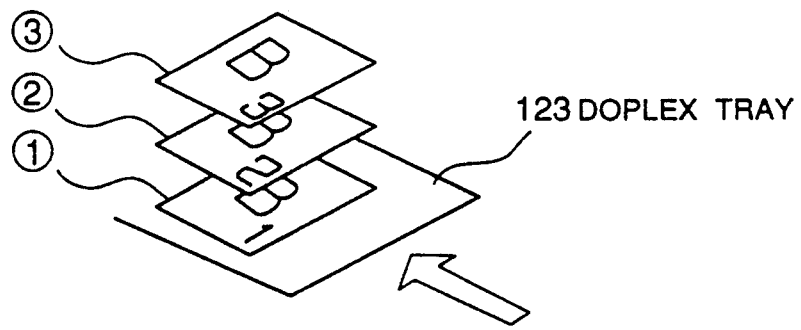
FIG. 23C
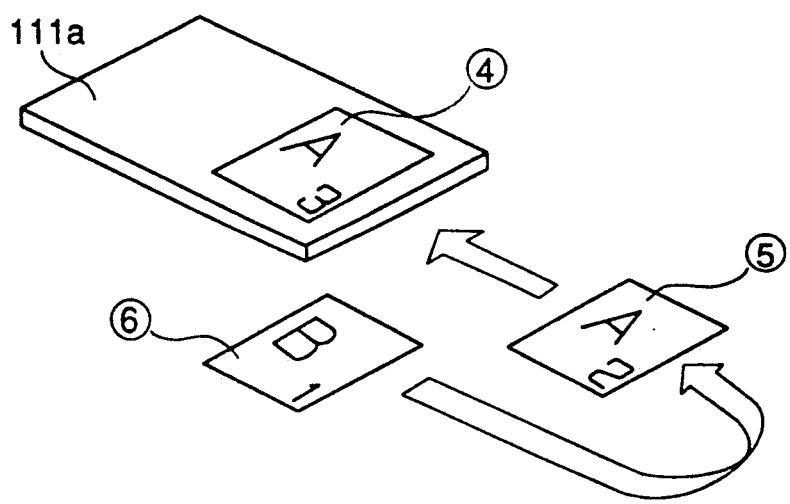

5,309,245

IMAGE FORMING APPARATUS HAVING FUNCTION FOR FORMING COMPOSITE IMAGE

BACKGROUND OF THE INVENTION (1) Field of the invention

The present invention generally relates to an image forming apparatus such as a digital copy machine, and more particularly to an image forming apparatus in which a composite image obtained by composition of a plurality of images can be automatically formed.

(2) Description of related art

Conventionally, handling of confidential documents is an important matter for companies and public organization. Documents required for conventions are often copied in plural times and the copied papers are brought out. Thus, to keep a secret, serial numbers are previously provided on respective documents, and copies of the documents are distributed to persons participating in a convention. Then, relationships between persons to which the copies of the documents are distributed and serial numbers provided on the documents are recorded. Conventionally, an equipment for numbering documents when copying and an equipment for superposing a pattern (a serial number) on each of the documents when copying have been proposed.

However, when a document is copied in plural times with using the above equipments, a plurality of copied papers corresponding to the document have the same serial number. That is, numbers recorded on the copied papers corresponding to the document can not be changed one by one. Thus, in a case where the numbers recorded on the copied papers corresponding to one document are changed one by one, an operator must input to the equipment an instruction for changing the serial number to be recorded on each copied paper every copy operation of the document.

In addition, when the large number of documents are copied in plural times, a sorter unit is used to effectively perform the copy operations. To reduce the number of copied papers, a duplex copy in which images are formed on two sides of each of copied papers is performed. In these cases, also it is desired that serial numbers be effectively recorded on each copied paper.

SUMMARY OF THE INVENTION

Accordingly, a general object of the present invention is to provide a novel and useful image forming apparatus having a function for forming a composite image in which the disadvantages of the aforementioned prior art are eliminated.

A more specific object of the present invention is to provide an image forming apparatus having a function for forming a composite image in which image forming apparatus predetermined parts of composite images to be formed on a plurality of copied papers can be changed one by one.

The above objects of the present invention are achieved by an image forming apparatus having a first image generating portion which successively generates an integer number "n" first images and a second image generating portion which successively generates "m" second images different from each other, m being an integer equal to or greater than 2. The apparatus also has an image composition portion which combines an i-th first image (i=1, 2,... n)] and a j-th second image (j=1, 2,... m) to output a composite image $I_{ij}$. The apparatus also has a printing portion which prints composite images $I_{ij}$ on recording sheets, and a part which outputs the recording sheets having the composite images $I_{ij}$ formed thereon, and classifies n×m recording sheets into m sets based on the second images, each of m sets having n recording sheets.

According to the present invention, a plurality of composite images can be effectively formed on a plurality of recording sheets. Thus, it is easy to classify the recording sheets into m groups in accordance with the m second images in the composite images.

Additional objects, features and advantages of the present invention will become apparent from the following detailed description when read in conjunction with the accompanying drawings.

BRIEF DESCRIPTION OF THE DRAWINGS

FIG.22 is a table illustrating sections to which copied papers of documents are supplied and respective corresponding characters to be formed on the copied papers.

FIGS. 23A, 23B, and 23C are diagrams illustrating a flow of the process, shown in FIG.17, in the confidential-duplex copy mode.

DESCRIPTION OF THE PREFERRED EMBODIMENT

A description will now be given of an embodiment of the present invention.

Figure 1:
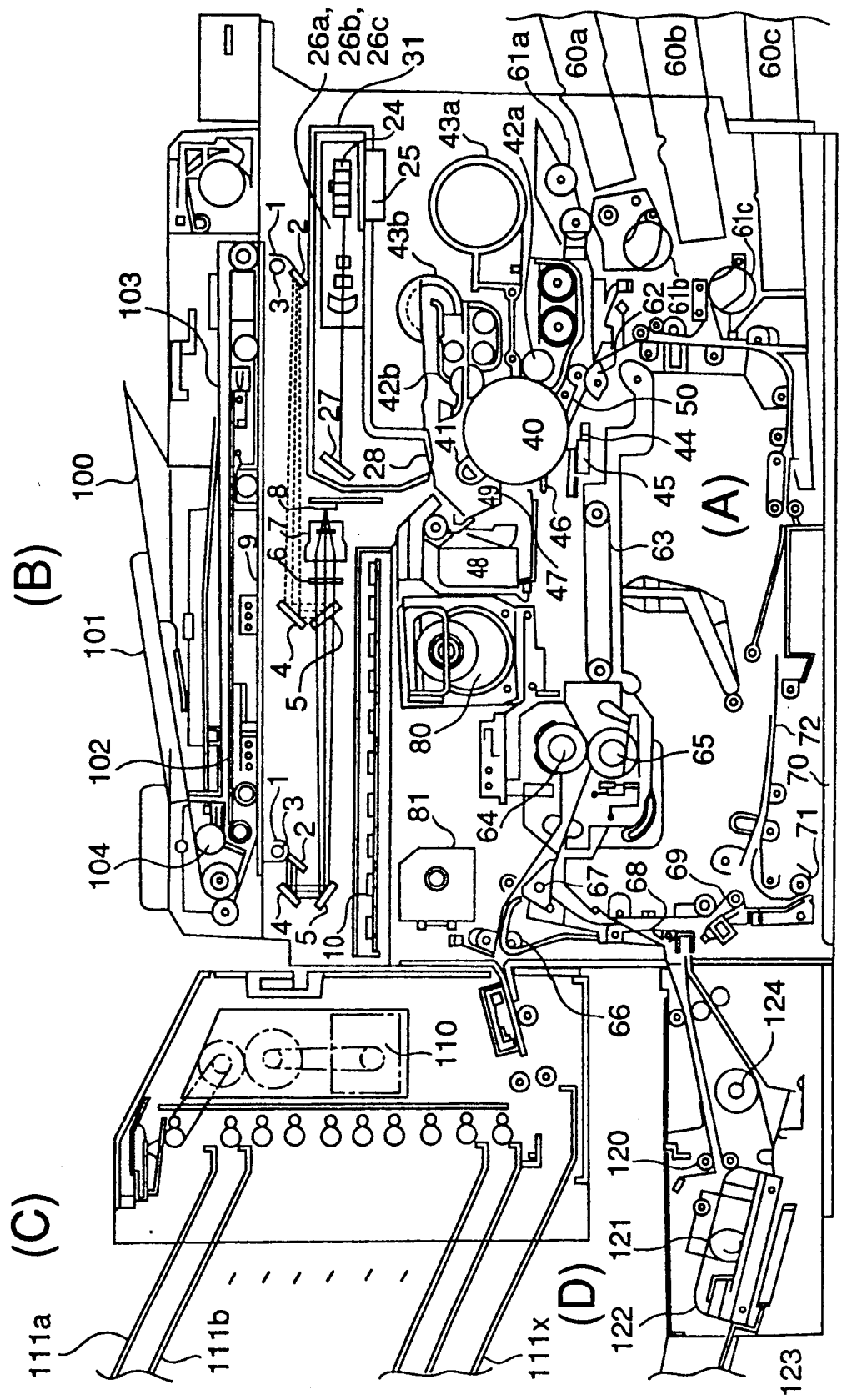
FIG.1 is a diagram illustrating a constitution of a digital copy machine according to the present invention.

FIG.1 shows the construction of a digital copy machine. The digital copy machine includes a main unit A, an ADF unit (automatic document feeder unit) B, a sorter unit C and a duplex unit D. The main unit A includes a scanner unit, an exposure unit, a photosensitive drum, a developing unit and a paper feeding mechanism. A description will now be given with respect to each of these units of the digital copy machine, by referring to FIG.1.

(1) Scanner Unit

The scanner unit of the main unit A will be described. The scanner unit includes a first scanner and a second scanner. The first scanner has a reflector 1, a first mirror 2 and a light source 3, and is moved at a given speed. The second scanner has a second mirror 4 and a third mirror 5, and is moved at a speed that is half the speed of the first scanner in a direction to follow the first scanner. A document (not shown) placed on a contact glass 9 is optically scanned by the first scanner and the second scanner, and a light reflected from the scanned document is led to a lens 7 via a color filter 6. A converging light from the lens 7 is incident to an image sensor 8.

The light source 3 for emitting a scanning light uses either a fluorescent lamp or a halogen lamp. Generally, a fluorescent lamp has a long operating life and emits stably a scanning light, and the fluorescent lamp is more frequently used as the light source 3. In this embodiment, the reflector is mounted with a single fluorescent lamp light source. A plurality of light sources may be used with the reflector 1. The image sensor 8 is operated in synchronism with a sampling clock having a given frequency, and the light emitting frequency of the light source 3 must be higher than the sampling clock frequency used for the image sensor 8.

The image sensor 8 uses a charge coupled device (CCD) for reading out an image from the received light. The sensor 8 outputs an analog signal indicating the image of the document. The analog signal from the image sensor 8 is converted into a digital signal (analog-to-digital conversion), and this digital signal is supplied to an image forming unit 10. The image forming unit 10 carries out several image processing processes including a bilevel image rendition, a multilevel image rendition, a gradation process, a reduce/enlarge process and other edit functions, and outputs an image signal indicating image information to which the image processing is carried out. In this embodiment, in order to obtain a color image, a number of color filters, transparent to each color needed to be processed, is selectively arranged at an intermediate portion of an optical path from the document to the image sensor 8, and the color filters are interposed in the optical path suitably in accordance with the scanning of the document.

(2) Exposure Unit

Next, the exposure unit of the main part A will be described. The exposure unit performs image writing of the data supplied from the image processing unit. A raster scan is performed with a writing laser beam on a photosensitive drum 40, and the laser beam is emitted by a laser light source and the image of the document is described with a laser beam spot created by the laser beam on the photosensitive drum 40. The laser light source uses either a He-Ne laser or a semiconductor laser diode. A laser beam emitted by the semiconductor laser diode is suitable to the sensitivity of the photosensitive drum in a high wavelength range. A laser beam from the semiconductor laser diode can be easily modulated, and the cost of the diode is relatively low. In this embodiment, the semiconductor laser diode is used as the laser light source.

Figure 2:
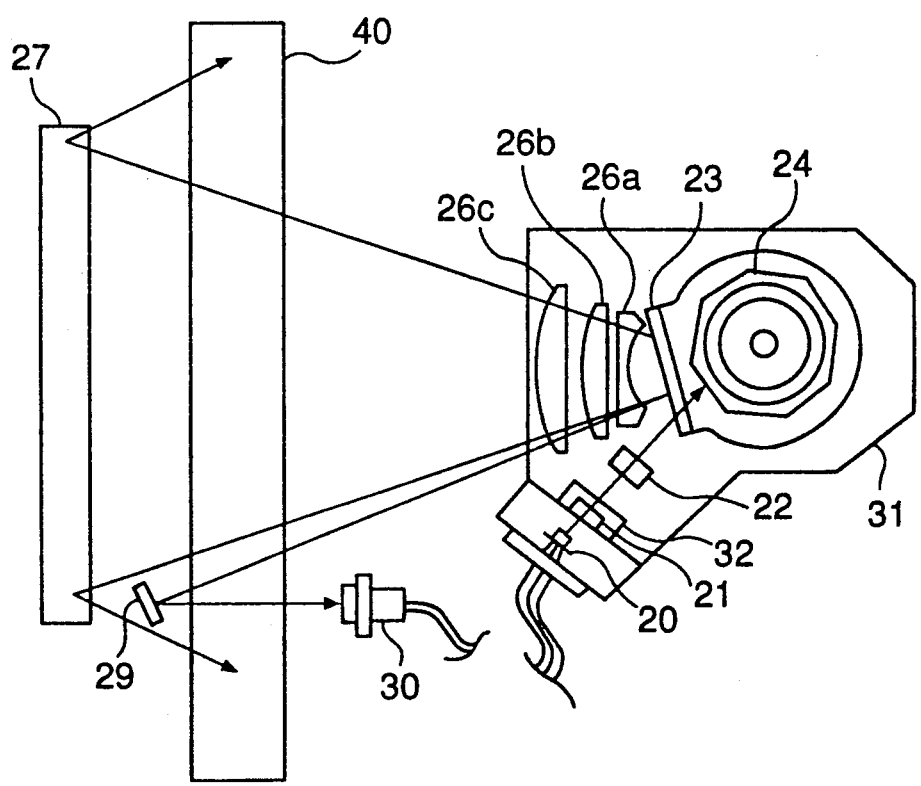
FIG.2 is a diagram illustrating an exposure unit provided in the digital copy machine shown in FIG.1.

FIG.2 shows the exposure unit of the digital copy machine. In FIG.2, a laser beam emitted by a semiconductor laser unit 20 is incident to a collimate lens 21 and converted by the collimate lens 21 into a collimated beam, and this laser beam is shaped by an aperture unit 32. The laser beam from the aperture unit 32 is projected to a polygon mirror 24 via a first cylinder lens 22. The polygon mirror 24 has a polygonal shape and a number of reflection surfaces on the periphery, and is rotated by a polygon motor 25 in a given direction at a given speed. The rotating speed of the polygon mirror 24 is determined in accordance with the rotation of the photosensitive drum 40, the image density, and the number of peripheral faces of the polygon mirror 24.

The laser beam incident to the polygon mirror 24 is deflected due to the rotation of the polygon mirror 24. The deflected beam from the polygon mirror 24 is incident to a f-$\theta$ lens 26a, 26b and 26c. The laser beam passing through the f$\theta$ lens 26a, 26b and 26c converges on the photosensitive drum 40 and a small beam spot is formed thereon. A main scanning on the photosensitive drum 40 is performed with the laser beam at a constant speed in a main scanning direction due to the rotation of the polygon mirror 24. A positional variation of the polygon mirror 24 is corrected by the f-$\theta$ lens 26a, 26b and 26c.

The laser beam passing through the f$\theta$ lens is reflected by a mirror 29 and led to a synchronization detector 30 which is located outside a range of the image writing on the photosensitive drum 40. A signal from the synchronization detector 30 is transmitted to a sensor unit via an optical fiber, so that a start position of the main scanning is detected and a synchronizing signal is generated. After a given time period has elapsed since the synchronizing signal is generated, each line of an image is formed on the photosensitive drum 40 when a main scanning is made by the laser beam. The above procedure is repeatedly performed until the image of the document is formed.

(3) Photosensitive Drum

Next, a description will be given of the photosensitive drum 40. The photosensitive drum 40 generally has a photosensitive layer on the peripheral surface. As a photosensitive layer that is sensitive to a laser beam (wavelength: 780 nm) emitted by the semiconductor laser unit, an OPC layer, an alpha-silicon layer, and a selenium-tellurium (Se-Te) layer are known. In this embodiment, an OPC layer is used, which is formed on the photosensitive drum 40. Generally, there are two image forming processes which are performed by image writing by means of a laser beam. One image forming process is called a N/P process, and in this process a laser beam is projected to an image section where an image is formed. The other is called a P/P (positive/-positive) process, and in this process a laser beam is projected to a background section and an image is formed in a section surrounded by the background section. In this embodiment, the N/P process is used for the photosensitive drum 40.

An electrostatic charger 41 for charging the photosensitive drum 40 is a type of a charger including a grid provided within the photosensitive drum 40. The surface of the photosensitive drum 40 is uniformly charged by the charger 41, and a potential of an image section on the photosensitive drum 40 is reduced by applying a laser beam thereto. A latent image is formed on the photosensitive drum 40, and a background section is at a potential between $-750$ V and $-800$ V while the image section is at a potential around $-500$ V. By means of a developing roller of a developing unit 42, a bias voltage between $-500$ V and $-600$ V is applied to the photosensitive drum 40, so that a toner with negative charge is applied to the latent image on the drum 40, the image then becoming appreciable.

(4) Developing Unit

The developing unit of the digital copier will be described. The developing unit includes a main developer 42a with a toner unit 43a and a sub developer 42b with a toner unit 43b. When a black-and-white image is formed, the sub developer 42a and the toner unit 43b are removed and only the main developer 42a and the toner unit 43a are used. When a color image is formed, a black image is developed by the main developer 42a with the toner unit 43a in which a black toner is contained, and another color image is concurrently developed by the sub developer with the toner unit 43b in which another color toner is contained. By combining the functions of the developing unit, the color filter 6 and the duplex unit, it is possible to carry out various color copying and editing functions.

The image after the developing is done by the developing unit is transferred by a transfer charger 44 with positive charge into a reverse side of a copy sheet which is fed to the photosensitive drum 40 in synchronism with the image transfer process. From the copy sheet to which the image is transferred, the positive charge is eliminated by a separation charger 45 which is mounted integrally with the transfer charger 44, and the sheet is then separated from the photosensitive drum 40. The remaining toner on the photosensitive drum 40 is removed by a cleaning blade 47 and the toner is returned to a toner tank 48. The residual charged toner pattern on the photosensitive drum 40 is removed by a charge removal lamp 49 which irradiates a light beam thereto.

A photosensor 50 having a light emitting element and a light receiving element is mounted at a position adjacent to the drum 40 for detecting an image density responsive to a reflection factor of the surface of the drum 40. For detecting the reflection factor, a given dot pattern (e.g., a black dot pattern) is formed at a portion of the drum 40, corresponding to the position of the photosensor 50, by writing the dot pattern by means of the exposure part. An image density is thus detected in response to the ratio of the reflection factor of the dot pattern formed portion (after the developing is done) relative to the reflection factor of the other portion of the drum surface. If it is detected that the image density is relatively low, a toner supply signal is supplied.

(5) Paper Feeding Mechanism

Next, the paper feeding mechanism of the digital copy machine will be described. This paper feeding mechanism includes three paper cassettes 60a, 60b and 60c. A duplex copying and a paper re-feeding can be performed by feeding a copy sheet, after an image is formed on one side, back to a paper re-feeding loop 72. When one of the paper cassettes 60a, 60b and 60c is selected and a start key is depressed, a roller (one of three rollers 61a, 61b and 61c) in the neighborhood of the selected cassette starts rotating. A copy sheet is fed to a registration roller 62 due to the rotation of the roller. The registration roller 6 starts rotating in synchronism with the movement of the toner image on the photosensitive drum 40 so that the copy sheet is fed to the photosensitive drum 40. The toner image is transferred into the copy sheet placed around the photosensitive drum 40, and this copy sheet is separated from the drum 40 and fed to a fixing roller pair by a separating/-transport part 63. The fixing roller part having a heating roller 64 and a pressure roller 65 carries out a fixing of the toner image on the copy sheet.

In a normal copy mode, the copy sheet after the fixing of the toner image is done is fed to an ejection portion of the sorter unit C by means of a selector pawl 67. In a multiplex copy mode, the copy sheet is fed back to the paper re-feeding loop 72 by means of the selector pawls 68 and 69, so that the copy sheet passing through the loop 72 is again sent to the registration roller 62. There are two duplex copying methods, one method is a duplex copying method using the main unit A only, and the other is a duplex copying method using the main unit A and the duplex unit D. When the duplex copying is performed with the main unit A only, the copy sheet is fed to a lower path by means of the pawl 67, it is also fed to a lower path by means of the pawl 68, and it is further fed to the tray 70 by means of the paper re-feeding loop 72. Due to the reverse rotation of the roller 71, the copy sheet is fed to a transport path in the opposite direction, and it is fed to the loop 72 by means of the pawl 69, and it is fed again to the registration roller 62.

The ADF unit B performs automatic feeding of a document including plural sheets. Each sheet of the document is automatically fed to the contact glass 9 by the ADF unit B one by one. After a copying process is done, each sheet of the document is automatically ejected to an ejection tray 103 by the ADF unit B. The document on a document stand 100 is aligned in line in a width direction of the document by a side guide 101, each sheet is separated from the remaining sheets of the document by means of a roller 104, and each sheet of the document is fed to the contact glass 9 due to the rotation of a transport belt 102. After the copying process is done repeatedly for the setting number of the copy repetition, each sheet is fed to the ejection tray 103 due to the rotation of the transport belt 102. A paper size of the document can be detected by sensing the position of the side guide 101 and counting the feeding time of the document.

The sorter unit C performs automatic sorting of copy sheets ejected from the main unit A, and in this automatic sorting process, the copy sheets are fed selectively into the respective ones of a plurality of bins 111a through 111x. A plurality of rollers are rotated by a drive motor 110, and each copy sheet is fed by the rotation of the rollers, and is selectively sent to each inlet portion of the bins 111a through 111x by means of a pawl located near each inlet portion of the bins. The duplex unit D performs a duplex copying process for plural sheets of a document. When the duplex copying is carried out by the main unit A with the duplex unit D, each copy sheet sent to a lower ejection portion by an ejection roller 66 is fed into the duplex unit D by means of a selector pawl 67. In the duplex unit D, each copy sheet is gathered into a tray 123 by means of an ejection roller 120, and the longitudinal and lateral sides of each copy sheet are aligned by means of a feed roller 121 and a side guide 122. Each copy sheet within the tray 123 is fed into the main unit A by means of a re-feeding roller 124, so that a copying process of the reverse side of each copy sheet is carried out. Each copy sheet is guided to the paper re-feeding loop 72 by means of the selector pawl 69. In the main unit A shown in FIG.1, a mirror 27, a dust-proof glass 28, a lens holding unit 31, a separation pawl 46, a main drive motor 80 and a fan motor 81 are mounted.

Figure 3:
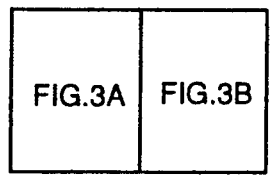
FIG.3 is a diagram illustrating a connecting relationship between FIG.3A and 3B.
Figure 3A:
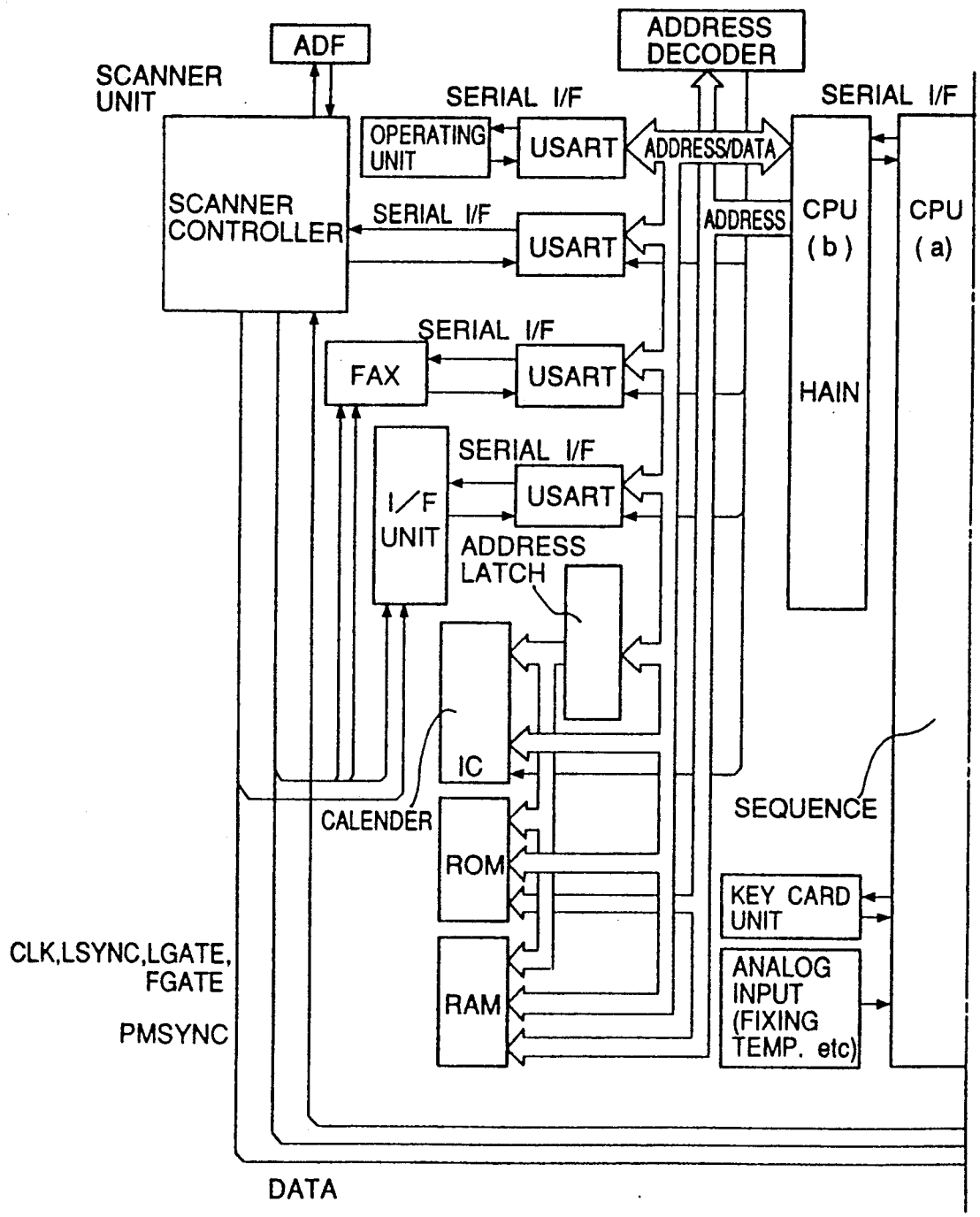
FIG.3A and 3B are block diagrams illustrating a control unit provided in the digital copy machine shown in FIG.1.
Figure 3B:
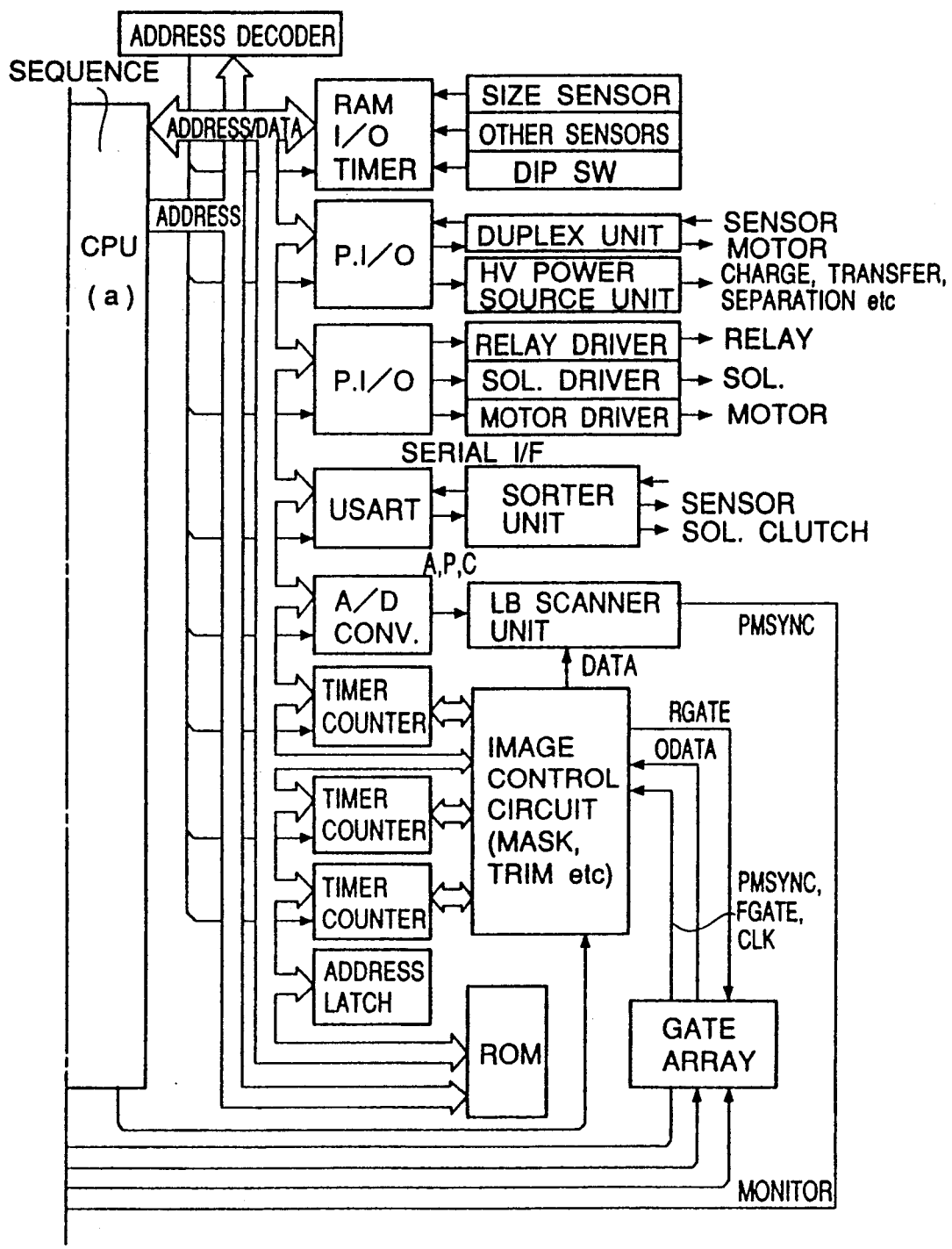

Next, a description will be given of a control unit which is provided within the digital copier shown in FIG.1, for controlling the operations of the above described parts of the digital copier. FIGS.3A and 3B show the construction of the control unit. This control unit includes a sequence controller CPU (a) and a main controller CPU (b), the sequence controller performing sequence control procedures, and the main controller performing operation control procedures. The two CPUs are interconnected by a serial interface (RS232C).

The sequence controller CPU (a) carries out the paper feed timing control, the image forming conditions setting and the output control. As shown in FIG.3B, a paper size sensor, a paper ejection sensor, a registration sensor, the duplex unit, a power source unit, a relay driver, a solenoid driver, a motor driver, the sorter unit and a laser beam scanner unit are connected to this sequence controller. The sensors connected to the sequence controller are the paper size sensor detecting a size and a direction of paper loaded into a paper cassette, a sensor detecting shortage of oil, a sensor detecting shortage of toner, a sensor detecting an open condition of a door, and a sensor detecting a short circuit of a fuse. Detection signals generated by these sensors are input to the sequence controller CPU (a).

The duplex unit includes a motor used for aligning a width of paper, a paper feeding clutch, a solenoid used for selecting a paper transport path, a sensor detecting the presence of paper, a side fence home-position detecting sensor, and other sensors related to paper transport. The power source unit applies a high voltage power in accordance with a duty factor which is obtained through pulse width modulation control based on the outputs of the electrostatic charger, the transfer charger, the separation charger and the developing bias electrode. The drivers connected to the sequence controller are a paper feeding clutch driver, a registration clutch driver, a counter driver, a motor driver, a toner supply solenoid driver, a power relay driver, and a fixing heater driver.

The sorter unit is connected to the sequence controller by a serial interface, and paper is fed in the sorter unit and ejected into the bins at a prescribed timing in accordance with a signal from the sequence controller. Analog inputs to the sequence controller are a fixing temperature, a photosensor input, a laser diode monitor input, a laser diode reference voltage, and a feedback data of an output of the power source unit. A heater on/off control or phase control is carried out based on an output of a thermistor in the fixing part in such a way that the fixing temperature is kept constant. The photosensor input is used to detect a density of a photo pattern so that a toner density control is carried out by switching on and off a toner supply clutch. The analog inputs to the sequence controller and the A/D converter are used to control the power of the laser diode to be constant. The power control is carried out in a way that the monitor voltage when the laser diode is turned on accords with a predetermined reference voltage (which voltage is preset so as to make the power of the laser diode at 3 mW).

An image control circuit provided within the control unit shown in FIG.3B generates a masking signal, a trimming signal, an erase signal and a photosensor pattern signal, and supplies a video signal (VDATA) to the laser beam scanner unit. The laser beam scanner unit carries out pulse width modulation in accordance with the video signal (VDATA), so that the video signal is converted into an analog signal. The laser diode is turned on and off in accordance with the modulated pulse, so that a multilevel latent image is formed on the photosensitive drum by exposure with a laser beam from the laser beam diode.

The gate array carries out synchronization of an image signal sent from the scanner unit. The image signal is made synchronous with a signal PMSYNC sent from the laser beam scanner unit, is converted into a signal ODATA in synchronism with a write signal RGATE, and is output to the above described image control circuit.

The main controller CPU (b) which carries out the operation control procedures controls a number of serial ports (USART) and a calendar IC. The sequence controller, an operating part, a scanner control circuit, a facsimile machine and an interface unit are connected to the serial ports. The operating unit includes display devices in which key-in data by an operator and operating conditions of the digital copier are displayed. The key-in data is serially transmitted to the main controller, and data serially received from the main controller is displayed on the display devices. Data related to image processing and image reading is serially transmitted to the scanner unit. Preset data is transmitted to and received from the facsimile machine and the interface unit. In the calendar IC, date and time are stored, and the main controller has a random access to the date and time in the calendar IC. By means of the calendar IC, the main controller displays the current time in the operating part, and performs a timer control of power on/off of the digital copier by setting a power on/off time to a timer.

Figure 4:
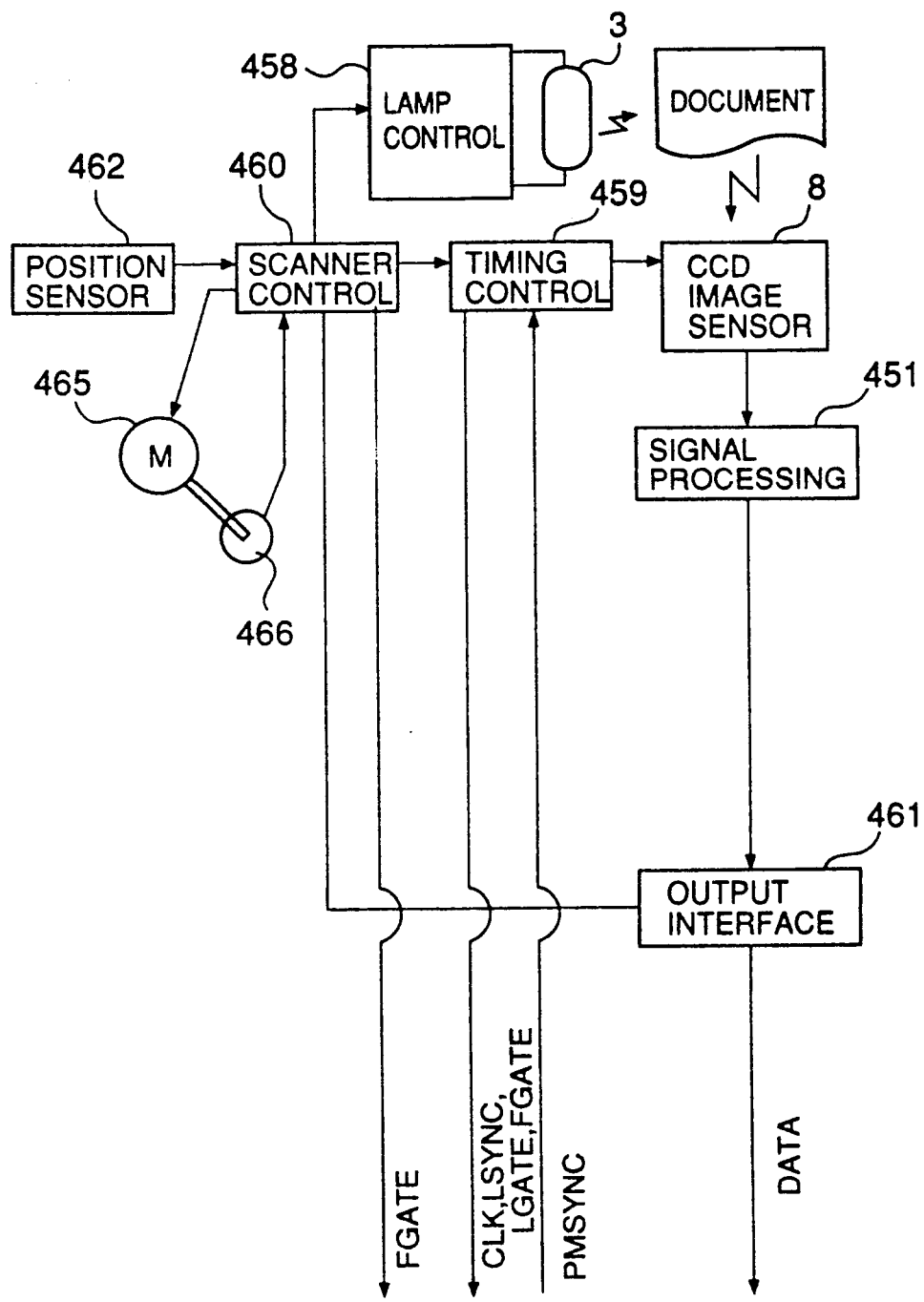
FIG.4 is a block diagram illustrating a scanner control circuit, shown in FIG.3A, for controlling an image scanner.

FIG.4 shows the construction of the scanner unit and the image scanner control part. In this image scanner control part, a scanner control circuit 460 controls operations of a lamp control circuit 458, a timing control circuit 459 and a scanner drive motor 465 in accordance with a signal supplied by a printer control part (not shown). The lamp control circuit 458 controls switching on/off the fluorescent lamp 3 and the optical quantity of light emitted by the lamp 3 in accordance with a control signal supplied by the scanner control circuit

460. A rotary encoder 466 is connected to a drive shaft of a scanner drive motor 465, and a position sensor 462 is provided for detecting a reference position of a sub scanning drive unit. An analog image signal supplied by the CCD image sensor 8 is converted into a digital signal by a signal processing part 451, and the digital signal is supplied to the exposure part via an output interface circuit 461.

The timing control circuit 459 outputs several signals to the image sensor 8 and to an image reproducing control unit (not shown), in accordance with a control signal supplied by the scanner control circuit 460. When the image scanner 8 starts scanning of a document, a transfer signal and a shift clock pulse signal are supplied by the timing control circuit 459 to the image sensor 8. Image data of one scanning line is transferred to a shift register by means of the transfer signal, and each bit of the data in the shift register is output one by one by the shift clock pulse signal. Also, a pixel sync clock pulse CLK, a main scanning sync pulse LSYNC, and a main scanning enable signal LGATE are supplied to the image reproducing control unit. This pixel sync clock pulse CLK is almost the same as the shift clock pulse sent to the image sensor 8. The main scanning sync pulse LSYNC is almost the same as a main scanning sync signal PMSYNC supplied by a laser beam sensor of a laser beam scanner unit (not shown), and an output of this pulse signal is inhibited when an image scanning is not performed. The main scanning enable signal LGATE is changed from a low level to a high level when the output data is detected as being effective.

The scanner control circuit 460 switches on the fluorescent lamp 3 and allows the scanner drive motor 465 to start rotating if a scanning start signal is received from the main controller CPU (b). The timing control circuit 45 is controlled by the scanner control circuit 460 so as to allow the image scanner 8 to start the image scanning. A sub scanning enable signal FGATE is changed from a low level to a high level at this time by the scanner control circuit 460. The level of the sub scanning enable signal FGATE is returned to a low level when a time needed for sub scanning of the maximum scanning length in the sub scanning direction has elapsed since the high level of the signal took place.

Figure 5:
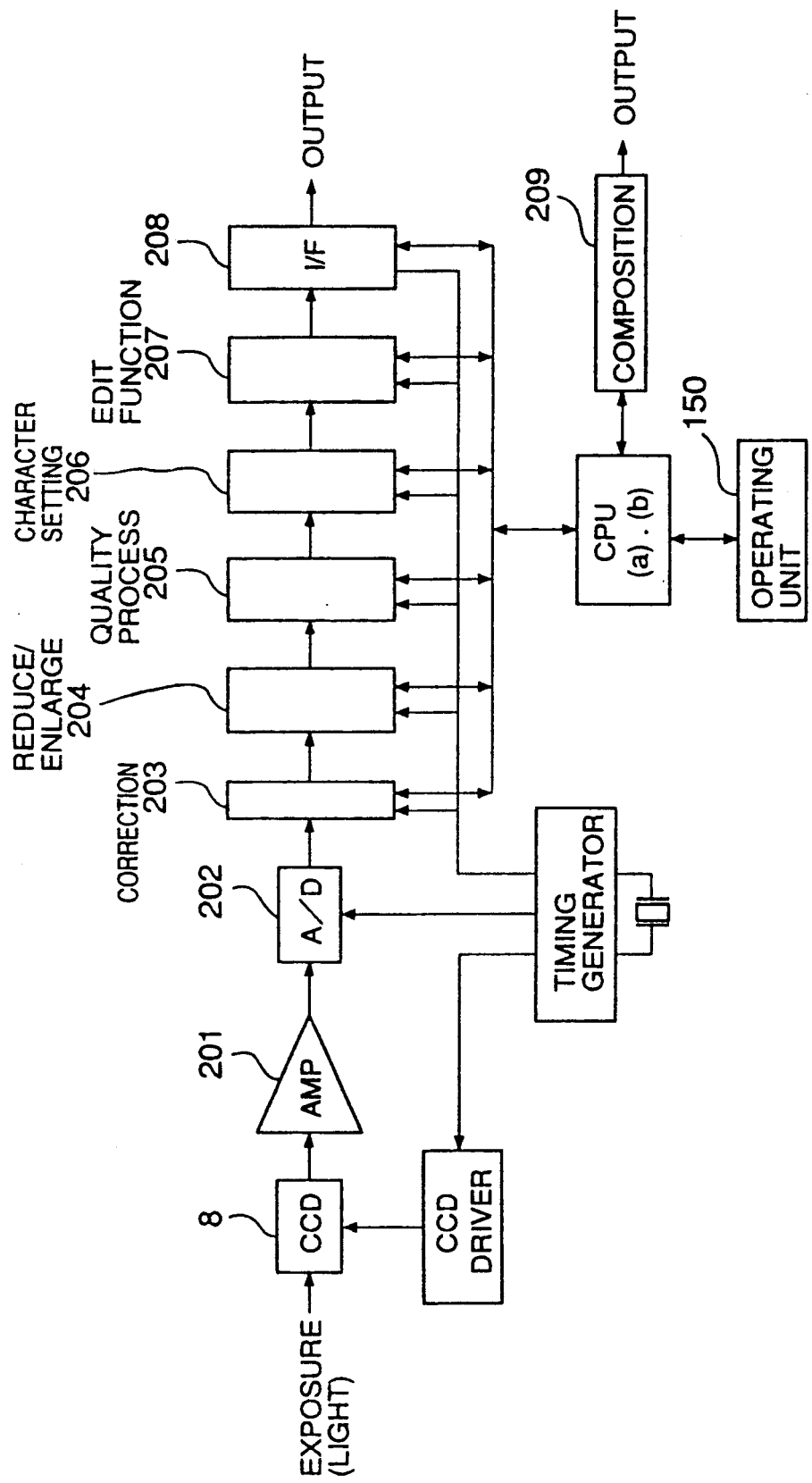
FIG.5 is a block diagram illustrating a example of a signal processing part including the scanner control circuit shown in FIG.3A and an image control circuit shown in FIG.3B.
Figure 6:
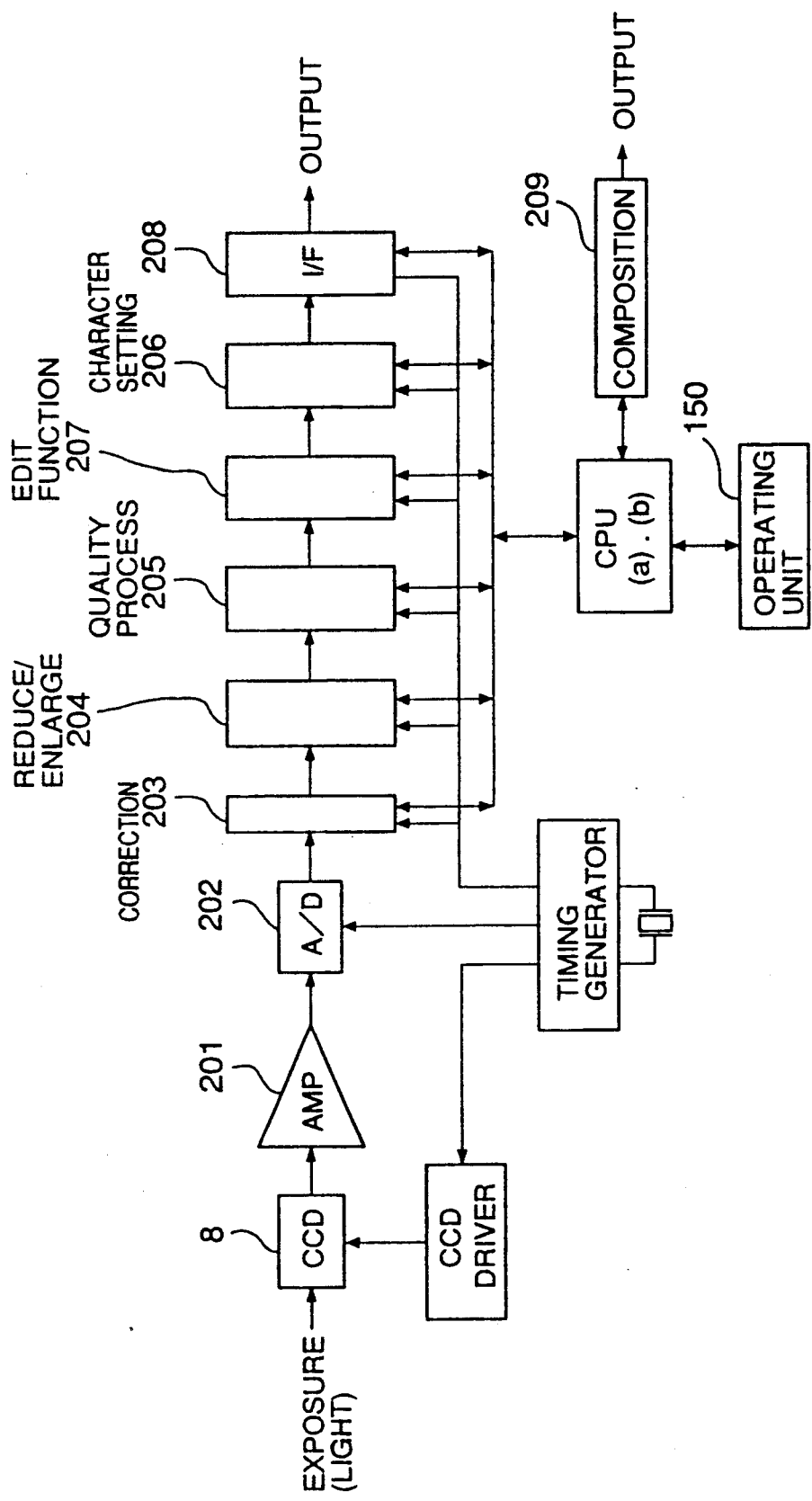
FIG.6 is a block diagram illustrating another example of a signal processing part including the scanner control circuit and the image control circuit.

FIG.5 shows the construction of the scanner control circuit and the image control circuit, which are provided within the control part in a first embodiment of the present invention. An analog image signal, output by the CCD image sensor 8, is amplified by an amplifier (AMP) 201, and is converted by an A/D (analog-to-digital) converter 202 into a digital image signal (e.g., a 6 or 8-bit signal). The digital image signal from the A/D converter 202 is corrected by a correction circuit 203. Correction processes with respect to the image signal performed by the correction circuit 203 include black set-off correction, shading correction, MTF correction, edge smoothing, etc. A reduce/enlarge circuit 204 carries out a reducing or enlarging of an image, described by the image signal from the correction circuit 203, in the main scanning direction. A reducing or enlarging of an image in the sub scanning direction is carried out by an optical scanning system when a document is scanned by means of the optical scanning system. The image signal from the reduce/enlarge circuit 204 is subjected to some image quality processes performed by a quality process part 205. The image quality processes include a gamma-correction process, an error-diffusion process and a dither process. This image signal is further transmitted to a character setting part 206, an edit function part 207 and an interface circuit 208 in this order, so that a composite image is output by the control part The edit function part 207 performs several edit functions with respect to the image signal transmitted. The processing sequence of the character setting part 206 and the edit function part 207 shown in FIG.5 may be inverted without influencing the resulting composite image, and FIG.6 shows a modified construction of the scanner control circuit and the image control circuit in which the sequence of the parts 206 and 207 is inverted. Signal processing parts in the correction circuit 203 through the interface circuit 208 are each connected to the sequence controller CPU (a) and the main controller CPU (b), and an appropriate setting is made in accordance with each copying mode of the digital copier. Signals (codes) respectively representing sections which should have copied papers are input via an operating unit 150. A composite circuit 209 generates numbers (additional characters) corresponding to the sections based on the signals (the codes) input via the operating unit 150. The composite circuit 209 also makes a table representing relationships between the numbers (the additional characters) and the sections which should have the copied papers.

Figure 7:
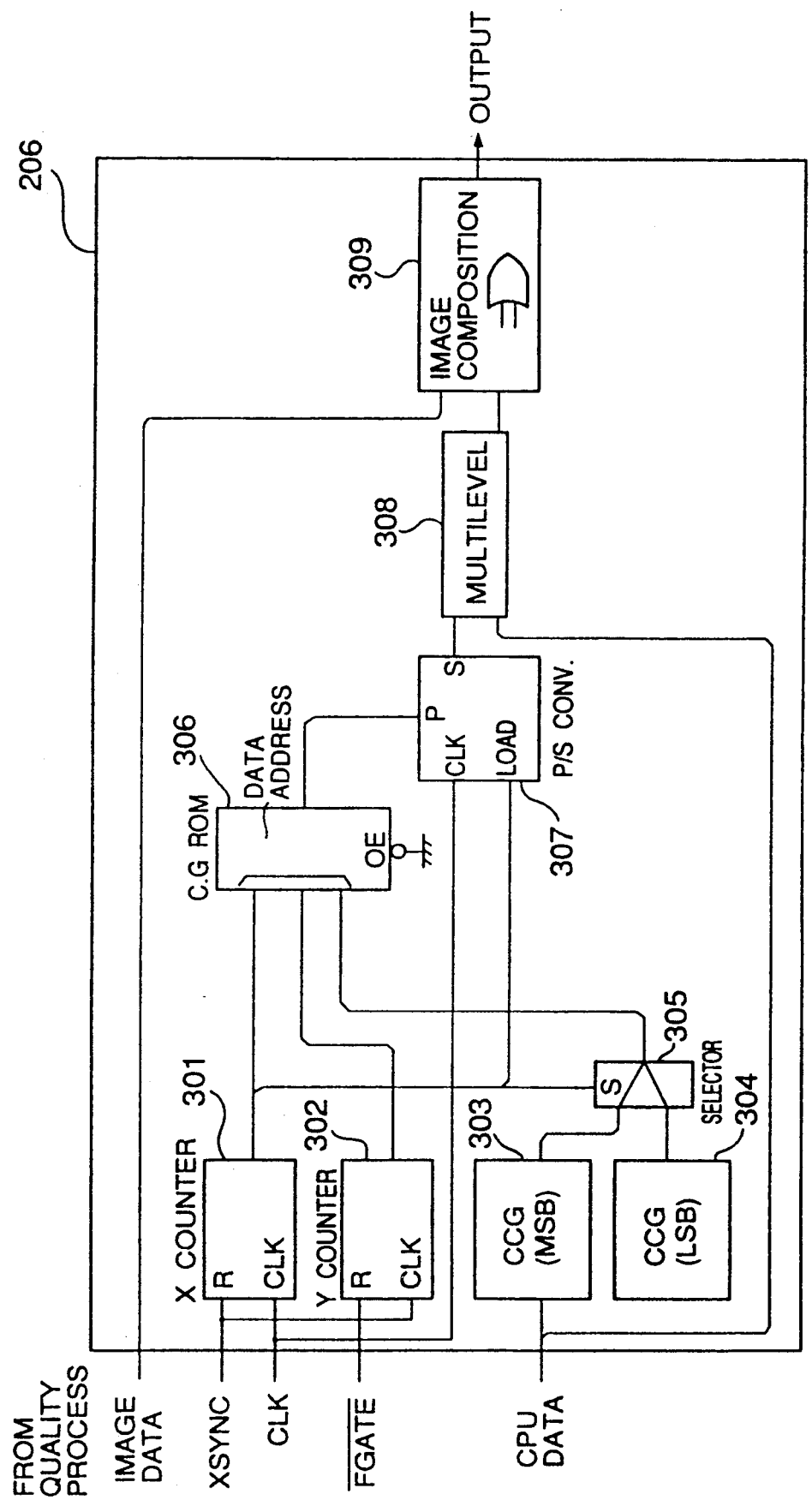
FIG.7 is a block diagram illustrating a character setting circuit shown in FIGS.5 and 6.

FIG.7 shows an example of the construction of the character setting circuit 206. The character setting circuit 206 includes an X counter 301, a Y counter 302, a character code register 303 for most significant bits of a character code, a character code register 304 for least significant bits thereof, a selector 305, a character generator ROM (CG ROM) 306, a parallel/serial converter (P/S CONV) 307, a multilevel circuit 308 and a image composition circuit 309.

Figure 8:
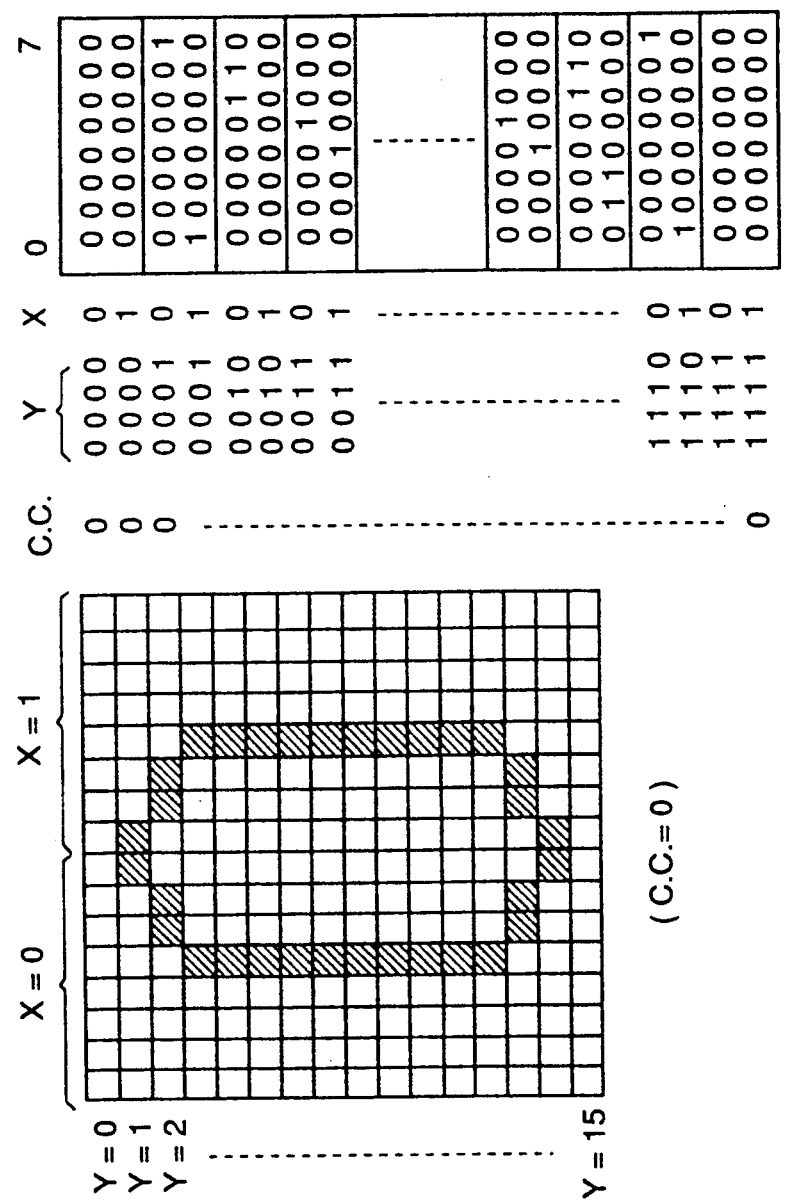
FIG.8 is a diagram illustrating character image data formed by a 16×16 dot matrix.

The X counter 301 is reset to zero by a main scanning sync signal XSYNC, and counts dots in the main scanning direction in accordance with a clock CLK (or, CLK/n divided by a division factor n). The Y counter is reset by a leading edge of a sub scanning signal FGATE, and counts dots in the sub scanning direction in accordance with the sync signal XSYNC (or, XSYNC/n divided by a division factor n). A character size of the additional character, added to an image of a confidential document, can be varied by changing the division factor n. If the additional character is a numeric character between 1 and 99, two character code registers are needed, one register for four most significant digits of the character code and the other for four least significant digits thereof. The character generator ROM 306 is a memory in which each data of a dot matrix pattern describing an image of an additional character is stored. Outputs of the X counter 301, the Y counter 302 and the character code registers 303 and 304 are transmitted to address terminals of the CG ROM 306, and data in accordance with the address of the memory indicated by the outputs of the counters and the registers is supplied from a data terminal of the CG ROM 306 to the P/S converter 307. FIG.8 shows a 16×16 dot matrix pattern describing an image of a numeric character "0", which pattern is stored in the CG ROM 306.

Figure 9:
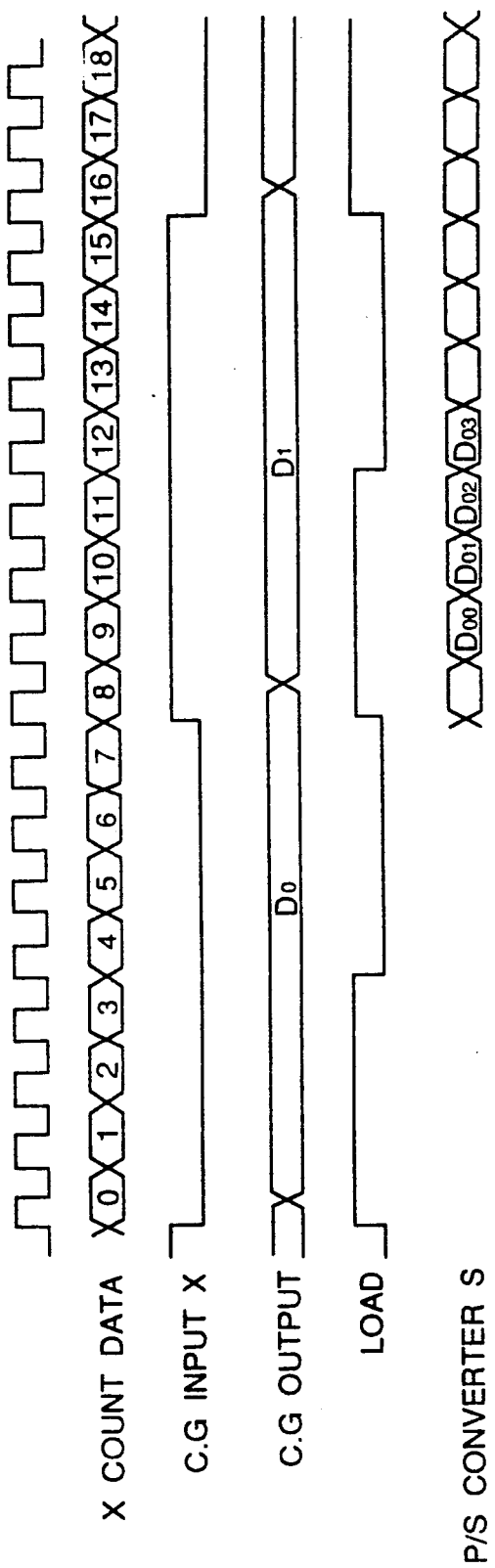
FIG.9 is a timing chart illustrating of various signals in the character setting circuit.

In the P/S converter 307, parallel data (e.g. 8 bit data) transmitted from the CG ROM 306 is converted into serial data, and the data of the dot matrix pattern is serially transmitted to the multilevel circuit 308 for each dot. The clock CLK is also input to the CL terminal of the P/S converter 307. The following parallel data is loaded to the P/S converter when the last bit of the preceding serial data is output. The serial data is successively output to the multilevel circuit 308 in synchronism with the clock CLK. FIG.9 is a time chart for explaining the parallel/serial conversion performed by the P/S converter 307.

Figure 10:
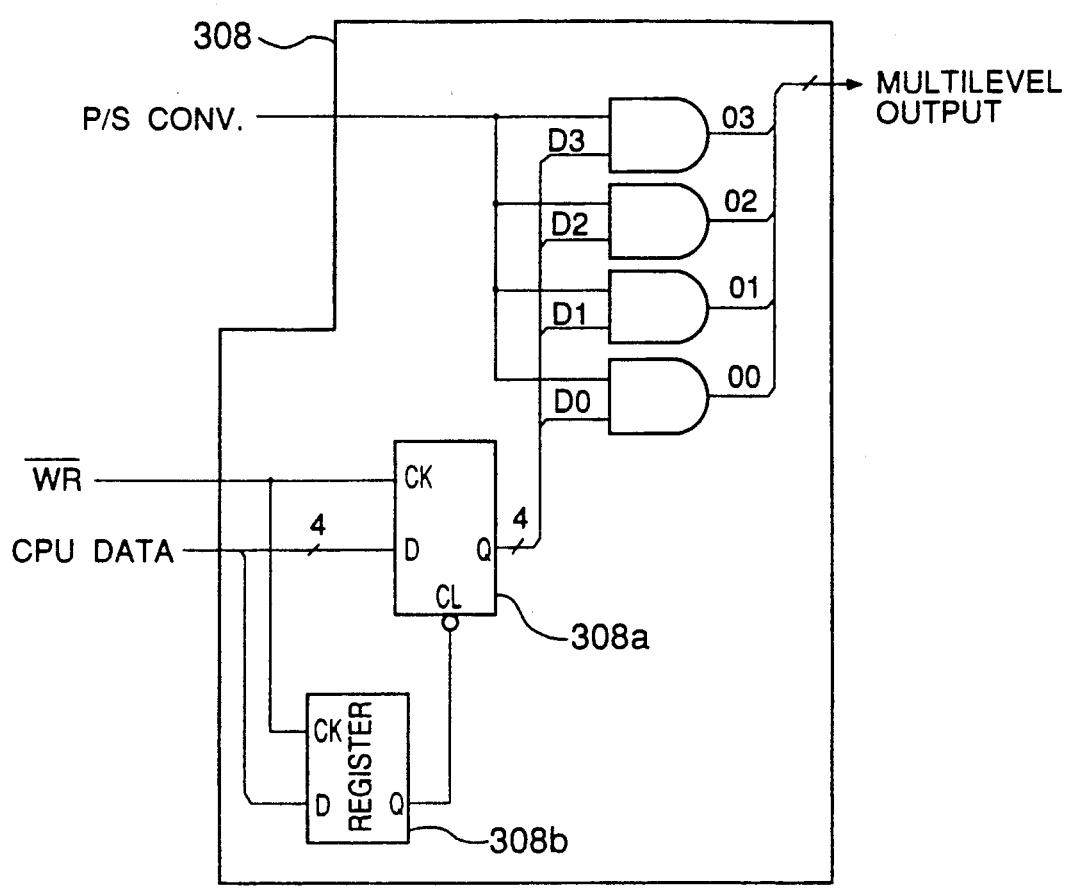
FIG.10 is a circuit diagram illustrating a multilevel circuit shown in FIG.7.
Figure 11:
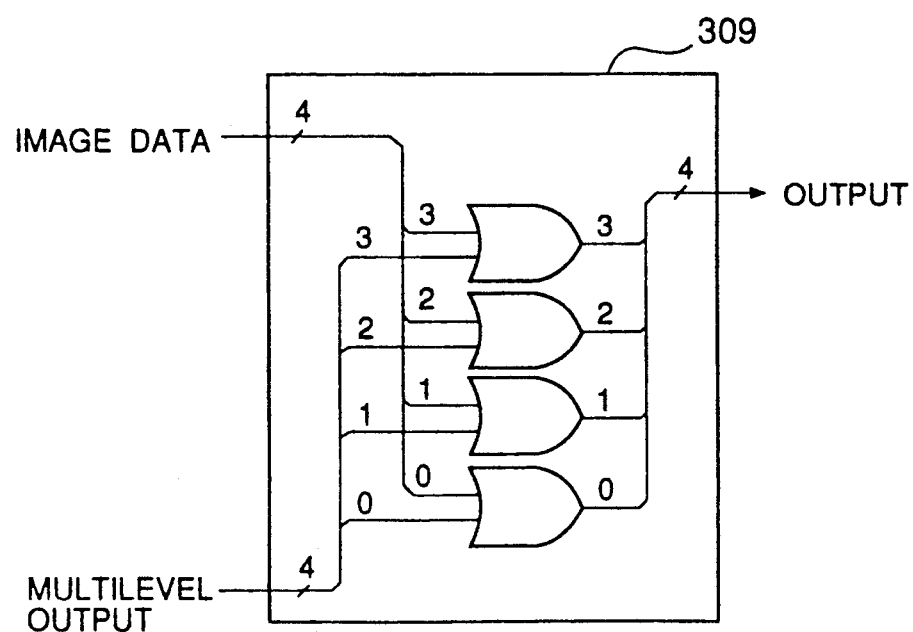
FIG.11 is a circuit diagram illustrating an image composition circuit shown in FIG.7.

The multilevel circuit 308 performs a multilevel rendition of the data sent from the P/S converter 307. A bit of the data from the P/S converter 307 which represents on dot of the dot matrix pattern describing the additional character is converted by the multilevel circuit 308 into plural bits indicating a multilevel gradation of each dot, so that multilevel gradation is given to the print image of the additional character. FIG.10 shows the construction of the multilevel circuit 308. In FIG.11, a prescribed CPU data is written to a density setting register 308a in accordance with a signal WR, and 4-bit data indicating a conjunction between an output of the density setting register 308a and a signal indicating one dot of the dot matrix pattern describing the additional character sent by the P/S converter 307 is output to the image composition circuit 309. It is possible in the multilevel circuit 308 of this embodiment that the print density of the additional character is represented by plural gradation levels $2^4 = 16$. A selection bit is sent to a register 308b, and this selection bit instructing the character setting circuit 206 whether or not the confidential mode is selected. If the confidential mode is not selected, zero is set to the selection bit in the register 308b, the register 308b outputs 4-bit data indicating zero, so that the multilevel circuit 308 outputs 4-bit data indicating zero only, regardless of what data is received from the P/S converter 307.

The image composition circuit 309 generates a composite image by combining the image data of the additional character from the multilevel circuit 308 with the image data (this image data is the output of the quality process part 205 shown in FIG.5, or the output of the edit part 207 shown in FIG.6). FIG.11 shows the construction of the image composition circuit 309. The image composition circuit 309 outputs 4-bit data indicating a disjunction between bits of the image data and corresponding bits of the output data of the multilevel circuit 308, so that the character setting circuit 206 outputs the 4-bit data indicating the composite image.

Figure 12:
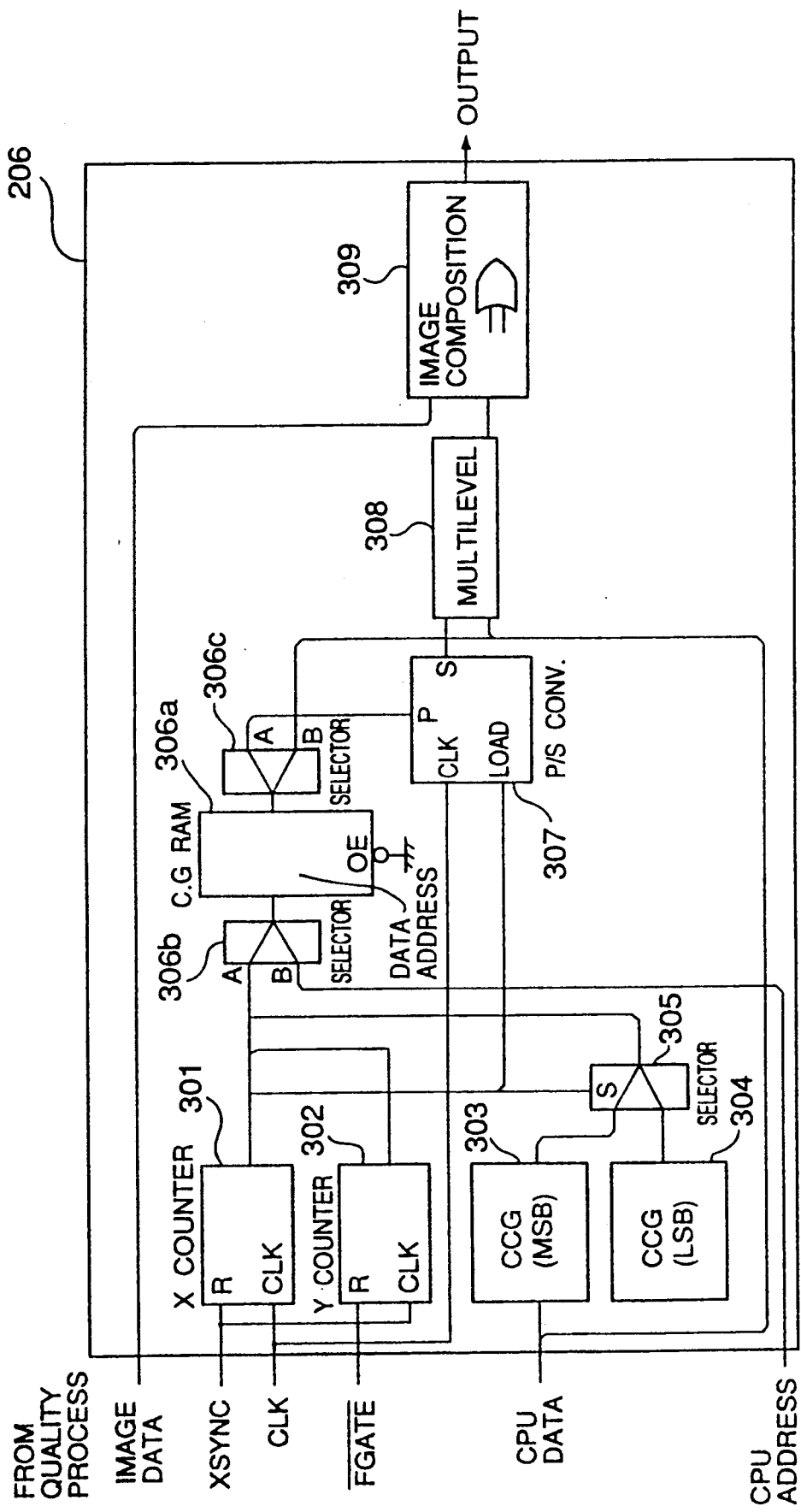
FIG.12 is a block diagram illustrating another example of the character setting circuit.

FIG.12 shows another example of the character setting circuit 206. In the character setting circuit 206 shown in FIG.12, a character generator 306a outputs additional characters, each of which are represented by dot data. The CPU loads the dot data representing an additional number into the character generator 306a. Both an input address selector 306b and a data selector 306c select A terminal, and the loading of the character generator RAM is carried out. Operations of the X counter 301, the Y counter 302, the character code register 303 (for most significant bits of a character code), the character code register 304 (for least significant bits of a character code), the selector 305, the parallel/serial converter 307, the multilevel circuit 308 and the image composition circuit 309 are the same as those shown in FIG.7.

Figure 13:
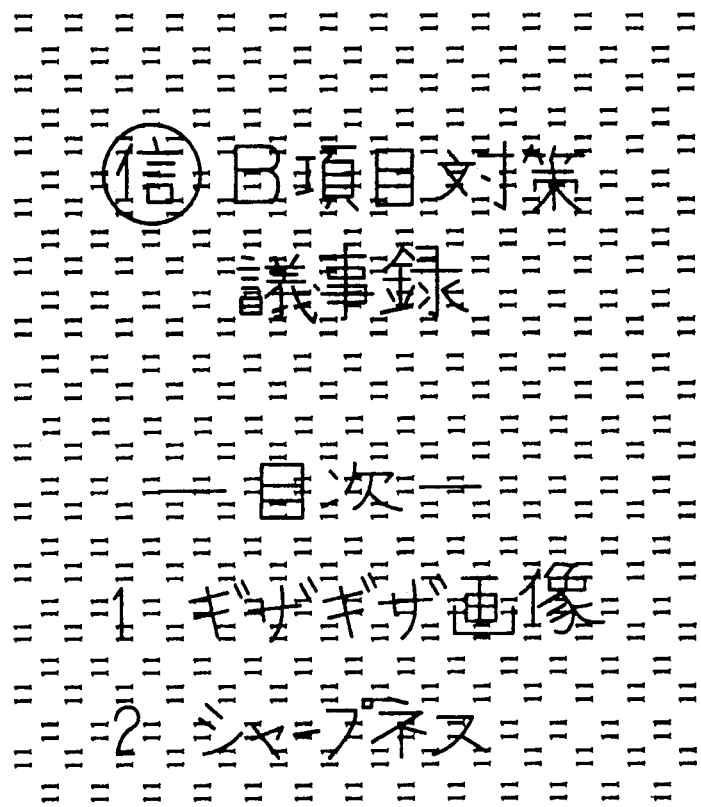
FIG.13 is a diagram illustrating an example of an composite image.
Figure 14:
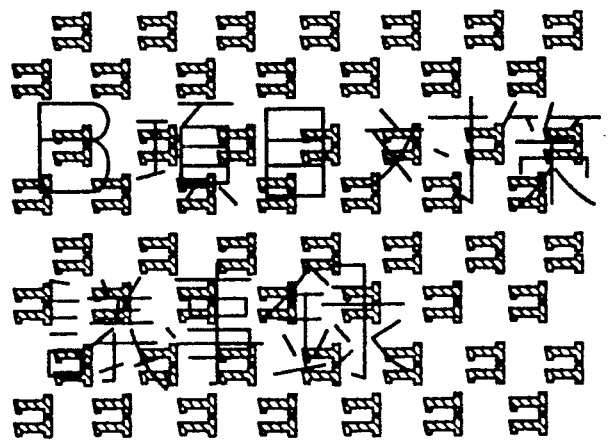
FIG.14 is a diagram illustrating another example of an composite image.

FIGS. 13 and 14 show examples of a composite image in which an image of a confidential document is combined with images of additional numbers. The size of the additional character is set within an appropriate range in which the additional character image is not detrimental to the ease of reading the document image. The image density of the additional character is set within an appropriate range in which the additional character image density is lower than the document image density, is not detrimental to the ease of reading the document, and is higher than a minimum image density at which the character image becomes appreciable after the repeated copy processes.

Figure 15:
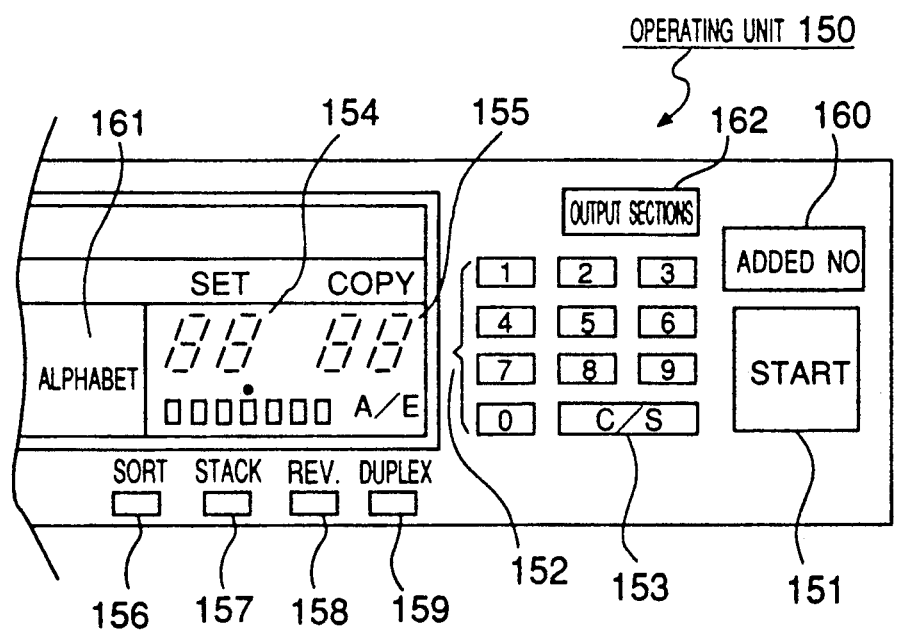
FIG.15 is a diagram illustrating an operation unit shown in FIG.5.

FIG.15 shows the operating unit 150. Referring to FIG.15, The operating unit 150 has a print start key 151 used for starting a copy process, ten keys 152 used for inputting the number of copies, a stop/clear key 153 used for clearing the number of copies set by the ten keys 152 and for interrupting a copy process, a seven segment display unit 154 for displaying the number of documents, a seven segment display unit 155 for displaying the number of copies to be made, a sorting mode key 156, a stacking mode key 157, a reverse mode key 158, and a duplex mode key 159. The operating unit 150 also has a confidential mode key 160 used for inputting an instruction of a confidential mode and for canceling the confidential mode, alphabetical keys 161 used for inputting names of destinations to receive copies, and a key 162 used for selecting an operation for outputting a table representing relationships between additional numbers and the destinations which should receive copies. The operating unit 150 also has other keys used for adjusting image density, for setting magnification and the like.

FIGS.16, 17, 18, 19, 20, and 21 show flow charts of processes performed by CPU.

Figure 16:
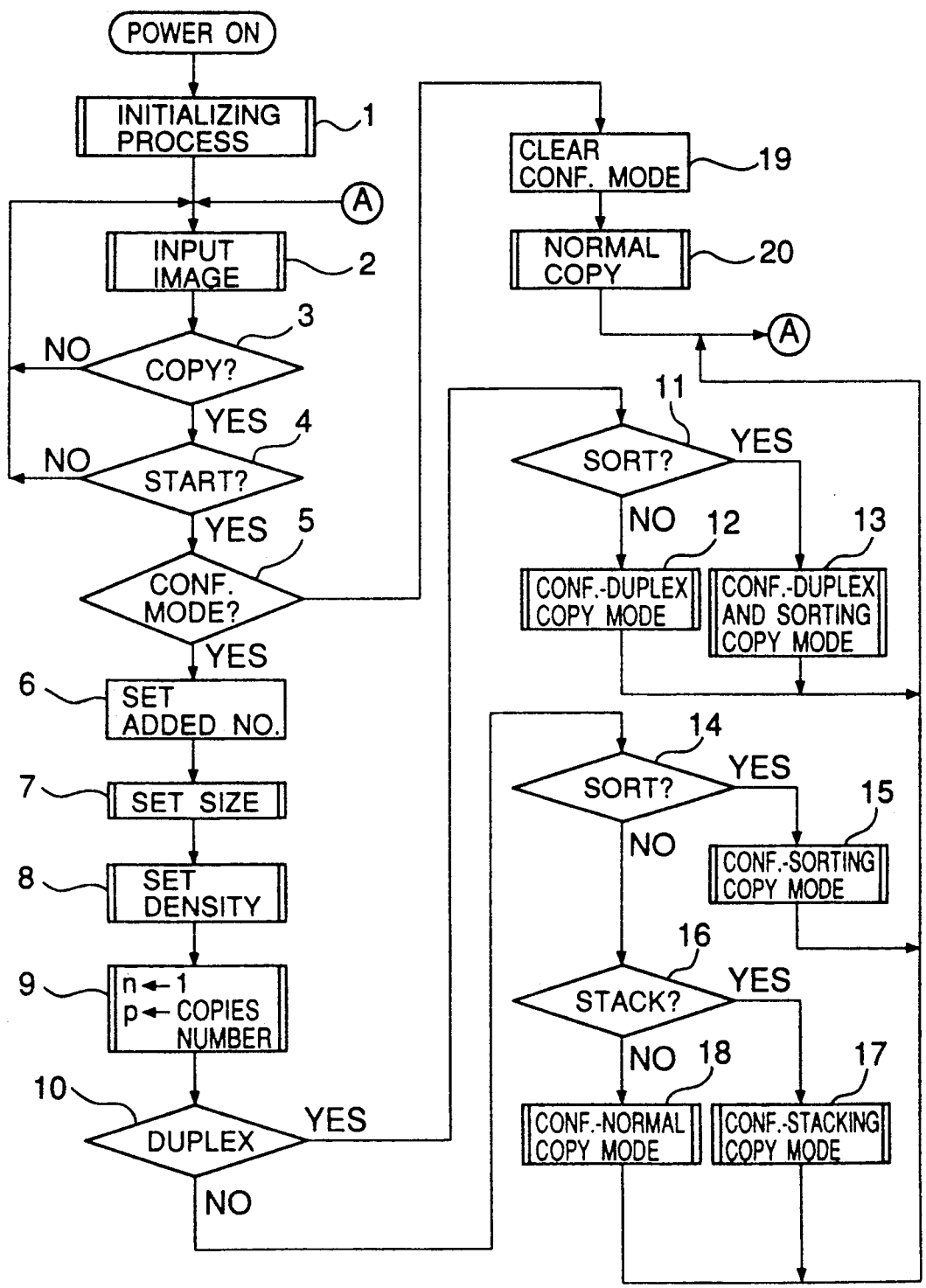
FIG.16 is a flow chart illustrating a control process carried out by CPU ((a) and (b)).

Referring to FIG.16, immediately after power is turned on, an initialization process is performed (step 1). Then instructions input by the operating unit 150 are read (step 2). When an instruction for starting a copy process is input under a condition in which a copy process can be performed (steps 3 and 4), it is determined whether or not the confidential mode is selected (step 5). When the confidential mode is not selected, the confidential mode activating register is cleared, and a normal copy process is carried out (steps 19 and 20). When it is determined, in step 5, that the confidential mode is selected, an output of the confidential mode activating register 308a is set to "1", the size of the additional character and parameters of image density are set (steps 6-8). Then the total number of copies is set in a register P and a register n for indicating the number of copies is set to "1" (step 9). A process in a selected mode is carried out.

In a case where the duplex mode is selected (step 10 and step 11 (NO)), a process in the confidential-duplex copy mode is carried out in step 12. In a case where the duplex and sorting modes are selected (step 10 and step 11 (YES)), a process in the confidential-duplex and sorting copy mode is carried out in step 13. In a case where the sorting mode is selected (step 10 and step 14 (YES)), a process in the confidential-sorting copy mode is carried out in step 15. In a case where the stacking mode is selected (step 10, step 14 and step 16 (YES)), a process in the confidential-stacking copy mode is carried out in step 17. In a case where the normal mode is selected (step 10, step 14 and step 16 (NO)), a process in the confidential-normal copy mode is carried out in step 18.

Figure 17:
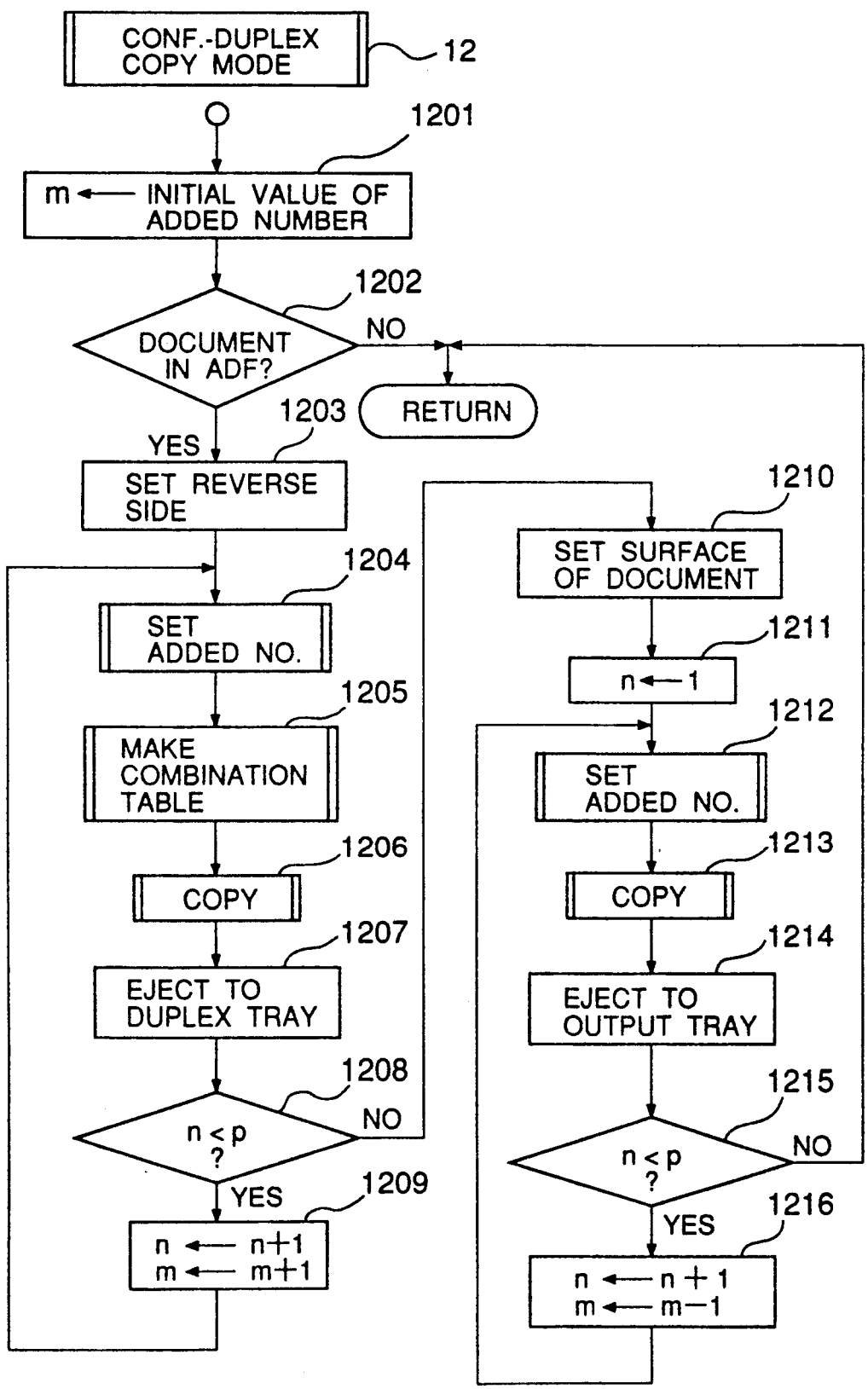
FIG.17 is a flow chart illustrating a process, shown in FIG.16, in a confidential-duplex copy mode.

The process in the confidential-duplex copy mode (step 12) is carried out in accordance with a flow chart shown in FIG.17.

Referring to FIG.17, an initial data of the additional number is set in a register m (step 1201), and it is determined whether or not there is a document in the automatic document feeder (ADF) B (step 1202). When there in no document in the ADF, the process returns to the main program flow. When there is a document in the ADF, a reverse side of the document is set at a reading position (step 1203). An additional number is set in a character code register (step 1204). The size of the additional character is set, as described above, within an appropriate range in which the additional character image is not detrimental to the ease of reading the document image. The image density of the additional character is also set, as described above, within an appropriate range in which the additional character image density is lower than the document image density, is not detrimental to the ease of reading the document, and is higher than a minimum image density at which the character image becomes appreciable after the copy process is repeated.

A process for making a table representing the destinations corresponding to additional characters (step 1205). In the process, data of additional characters corresponding to destinations which should receive copies and have been input via the operating unit 150 are generated, and stored in the RAM (see FIG.3A). Then when the key 162 (see FIG.15) is operated, the data stored in the RAM is printed, so that a combination table representing the destinations corresponding to the character numbers, as shown in FIG.22, is obtained. An operator can know additional characters respective corresponding to the destinations with reference to the combination table shown in FIG.22.

Next, a process for carrying a copy (step 1206) is carried out. After an end of copy, a copied sheet is ejected to a duplex tray 123 once (step 1207). Then it is determined whether or not the number of copies has reached the total number required by the operator (step 1208). When the number of copies has not reached the total number, the count value n of the number of copies and character data m of the additional character are respectively incremented by one (step 1209). Then, the process returns to step 1204. Until the number of copies reaches the total number required by the operator, the above steps 1204 through 1209 are repeatedly performed. As a result, the additional number which is set in the character code register and incremented one by one is superposed on an image signal corresponding to the reverse side of the document. A copy on which the document image and the additional character are combined with each other is obtained.

When the number of copies reaches the total number required by the operator (step 1208), the document is reversed by a reversing mechanism of the ADF, so that the surface of the document is set at the reading position (step 1210). The count value n of the number of copies is set to "1" (step 1211). The additional number having a last value set in the register in step 1209 is set (step 1212). Then a copy is carried out (step 1213), and the copied sheet is ejected to an output tray (step 1214). After this, it is determined whether or not the number of copies has reached the total number required by the operator (step 1215). When the number of copies has not reached the total number required by the operator, the count value n of the number of copies is incremented by one and the character data m of the additional number is decremented by one (step 1216). The process returns to step 1212, so that the decremented additional number (m) is set in the register. Until the number of copies reaches the total number required by the operator, the above steps 1212 through 1216 are repeatedly carried out. As a result, the additional number which is the same as that on the reverse side of each copied sheet is superposed on an image signal corresponding to the surface of the document. That is, a duplex copy on which the same additional number is combined with the document image on each side is ejected from the copy machine.

A description will now be given of an example in which the initial value of the additional number is "1" and the total number required by the operator is "3".

A first document image "A" is formed on the surface of the document and a second document image "B" is formed on the reverse side of the document, as shown in FIG.23A. A first copied sheet on which the second document image "B" and the additional number "1" are formed, a second copied sheet on which the second document image "B" and the incremented additional number "2" are formed, and a third copied sheet on which the second document image "B" and the further incremented additional number "3" are formed are successively stacked on the duplex tray 123, as shown in FIG.23B (①② and ③). Then, the third copied sheet is reversed, and the first document image "A" and the additional number "3" are copied on the reverse side of the third copied sheet, so that a duplex copied sheet in which the additional number "3" is formed on two sides thereof is ejected to a bin 111a, as shown in FIG.23C (④). After that, the second copied sheet is reversed, and the first document image "A" and the decremented additional number "2" are copied on the reverse side of the second copied sheet, so that a duplex copied sheet in which the additional number "2" is formed on two sides thereof is ejected on the bin 111a, as shown in FIG.23C (⑤). Further, the first copied sheet is reversed, and the first document image "A" and the further decremented additional number "1" are copied on the reverse side of the first copied sheet, so that a duplex copied sheet in which the additional number "1" is formed on two sides thereof is ejected on the bin 111a, as shown in FIG.23C (⑥).

In the above example, the reversing unit D of the first-in last-out system is used. However, the reversing unit of the first-in first-out system can be also used.

Figure 18:
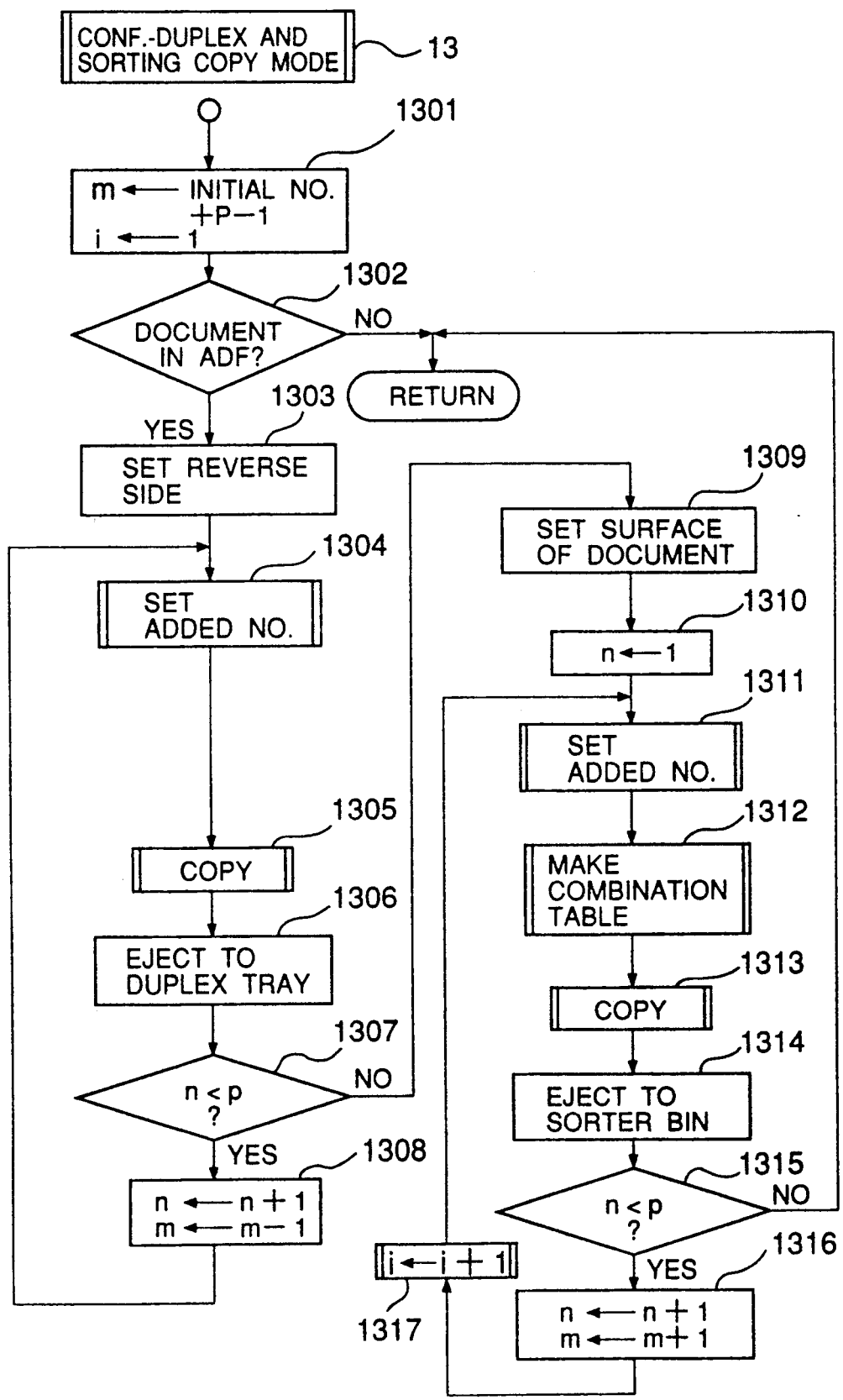
FIG.18 is a flow chart illustrating a process, shown in FIG.16, in a confidential-duplex and sorting copy mode.

The process in the confidential-duplex and sorting cop mode (step 13) is carried out in accordance with a flow chart shown in FIG.18.

Referring to FIG.18, a value is set in a register m (step 1301). The value set in the register m is obtained by subtracting "1" from a value obtained by a calculation in which the initial data of the additional number and the total number P of copies required by the operator are added to each other. An initial value "1" is set in a register i (step 1301). A value set in the register i represents a sorter bin. The initial value "1" set in the register i corresponds to a first bin 111a. In a case where a copy process is carried out in the sorting mode, the copied sheet having the smallest additional number formed thereof is stacked on the first bin 111a. It is determined whether or not there is a document in the ADF (step 1302). When there is no document in the ADF, the process returns to the main program flow. When there is a document in the ADF, the reverse side of the document is set at the reading position (step 1303). An additional number to be printed is set in the character code register (step 1304). Then a copy process is carried out (step 1305), and a copied sheet is ejected to the duplex tray 123 once (step 1306). It is determined whether or not the number of copies has reached the total number required by the operator (step 1307). When the number of copies has not reached the total number required by the operator, the count value n of the number of copies is incremented by one, and the character data m of the additional number (in the register m) is decrement by one (step 1308). The process returns to step 1304. Then, until the number of copies reaches the total number required by the operator, the above steps 1304 through 1308 are repeatedly carried out. As a result, the additional number which is set in the character code register and decremented one by one is superposed on an image signal corresponding to the reverse side of the document. A copied sheet on which the document image and the additional character are combined with each other is obtained.

When it is determined that the number of copies has reached the total number required by the operator in step 1307, the document is reversed by the reversing mechanism of the ADF so that the surface of the document is set at the reading position (1309). The number n of copies is reset to "1" (step 1310). The additional number having a last value set in the resister in step 1308 is reset in the register (step 1311). Then a process for making the combination table (shown in FIG.22) is carried out in the same manner as described above (step 1312). A copy process is carried out (step 1313), and a copied sheet is ejected to a sorter bin corresponding to a value in the register i (step 1314). It is determined whether or not the number of copies reaches the total number required by the operator (step 1315). When the number of copies does not reach the total number required by the operator, the count value n of the number of copies and the character data m of the additional number are incremented by one (step 1316). Then the value in the register i, representing the sorter bin, is incremented by one (step 1317). The value "2" in the register i (i=2) represents a second sorter bin 11b. After step 1317, the additional number which is incremented by one is set in the register (step 1311). Then until the number of copies reaches the total number required by the operator, the above steps 1311 through 1317 are repeatedly carried out. As a result, the additional number which is the same as that on the reverse side thereof is superposed on an image signal corresponding to the surface of the document. That is, a duplex copied sheet on which the same additional number is combined with the document image on each side is ejected from the copy machine. The duplex copied sheets successively ejected, in an increasing order of the additional number, to the sorter bins from the first sorter bin 111a.

For example, in a case where the initial data of the additional number is "1" and the total number P of copies required by the operator is "3", an initial value "3 (=1+3−1)" is set in the register m. In this case, while three copy process are carried out, a first copied sheet having an additional number "3", a second copied sheet having an additional number "2" and a third copied sheet having an additional number "1" are successively stacked on the duplex tray 123. Then a first duplex copied sheet having the additional number "1" formed on two sides thereof is ejected to the first sorter bin 111a, a second duplex copied sheet having the additional number "2" formed on two sides thereof is ejected to the second sorter bin 111b, and a third duplex copied sheet having the additional number "3" formed on two sides thereof is ejected to the third sorter bin 111c.

Figure 19:
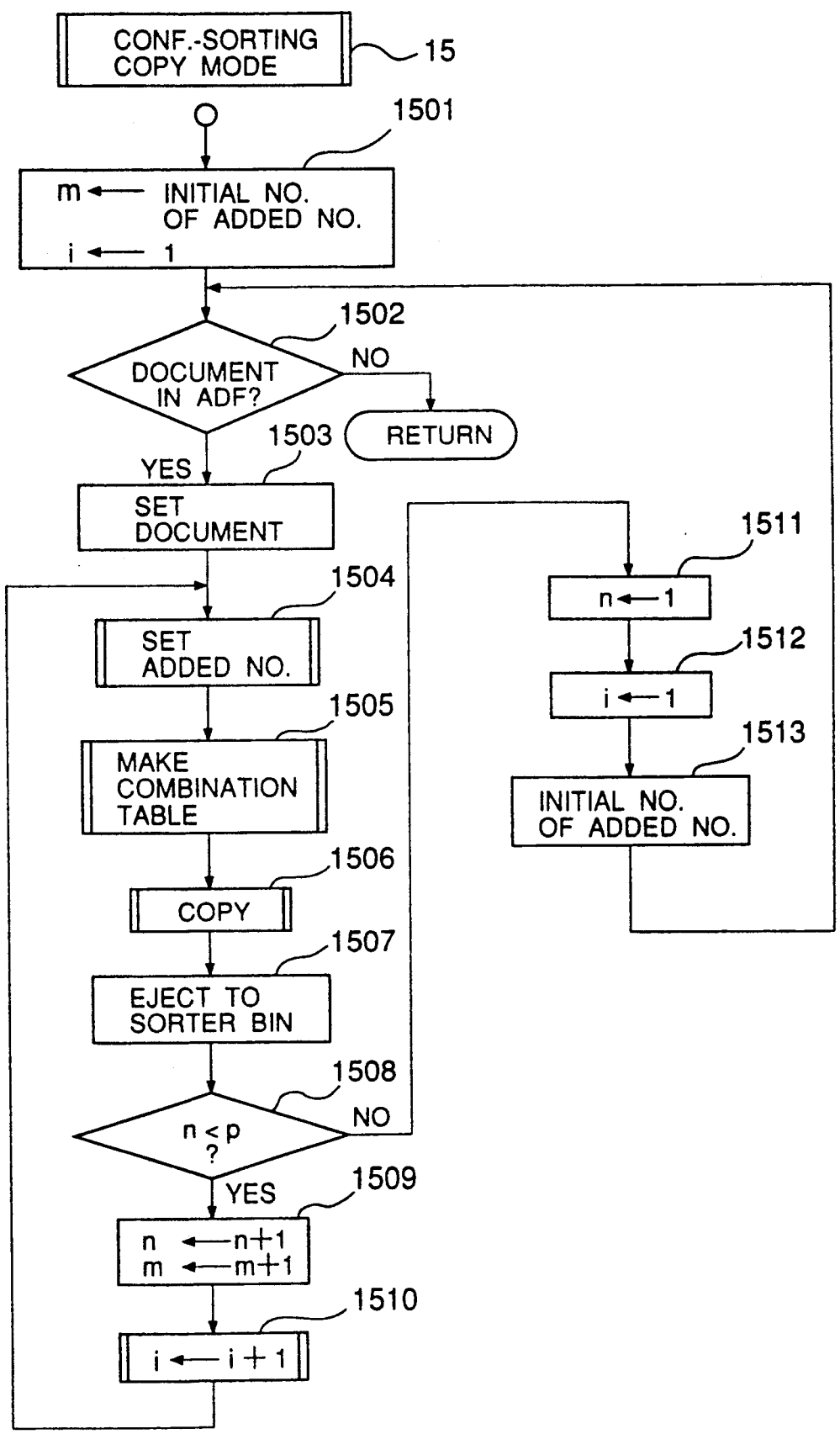
FIG.19 is a flow chart illustrating a process, shown in FIG.16, in a confidential-sorting copy mode.

The process in the confidential-sorting copy mode (step 15) is carried out in accordance with a flow chart shown in FIG.19.

Referring to FIG.19, the initial data of the additional number is set in the register m and an initial value "1" is set in the register i (step 1501). The value in the register i represents a position of the sorter bin. The initial value "1" represents the first sorter bin 111a. It is determined whether or not there is a document in the ADF (step 1502). When there is no document in the ADF, the process returns to the main program flow. When there is a document in the ADF, the document is set at the reading position (step 1503). An additional number to be printed on a copied sheet is set in the character code register (step 1504). The process for making the combination table shown in FIG.22 is carried out (step 1505). Then a copy process is carried out (step 1506), and a copied sheet is ejected to a sorter bin corresponding to the value in the register i (step 1507). A first copied sheet is ejected to the first sorter bin 111a. It is determined whether or not the number of copies has reached the total number of copies required by the operator (step 1508). When the number of copies has not reached the total number required by the operator, the count value n of the number of copies and the character data of the additional number are incremented by one (step 1509). The value in the register i is incremented (step 1510), and the process returns to step 1504. Then, until the number of copies reaches the total number required by the operator, the above steps 1504 through 1510 are repeatedly carried out. As a result, the additional number which is set in the character code register and incremented one by one is superposed on an image signal corresponding to the reverse side of the document. Copied sheets are successively ejected, in an increasing order of the additional number, to the sorter bins starting from the first sorter bin 111a.

When it is determined that the number of copies reaches the total number required by the operator in step 1508, the count value n of the number of copies is reset to "1" (step 1511). A value "1" is reset in the register i (step 1512). The character data m of the additional number is reset to the initial value (step 1513). Then the process returns to step 1502. When there is a document in the ADF, the above steps 1502 through 1513 are repeatedly carried out. As a result, additional numbers formed on copied sheets stacked in each sorter bin are the same. Copied sheets are successively ejected, in an increasing order of the additional number, to the sorter bins starting from the first sorter bin 111a.

A description will now be given of an example in which the initial value of the additional number is "1" and the total number required by the operator is "3".

Figure 24A:
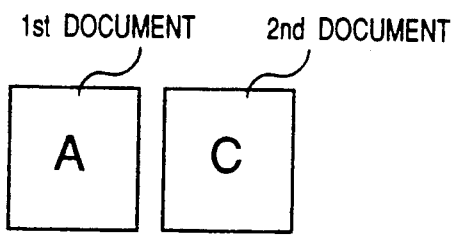
FIGS.24A, 24B, 24C and 24D are diagrams illustrating a flow of the process, shown in FIG.19, in the confidential-sorting copy mode.
Figure 24B:
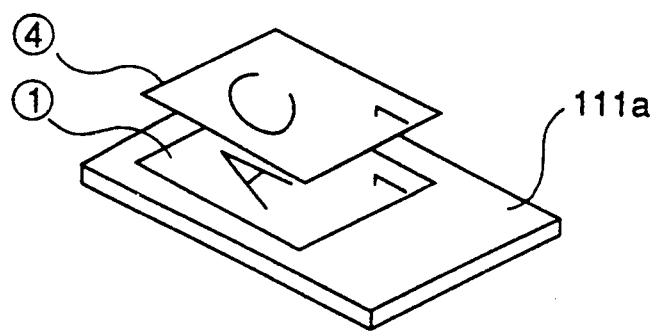
Figure 24C:
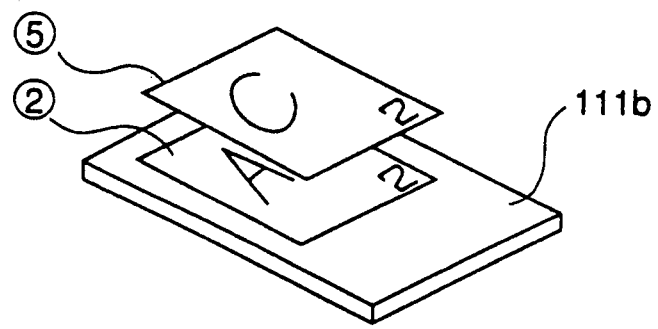
Figure 24D:
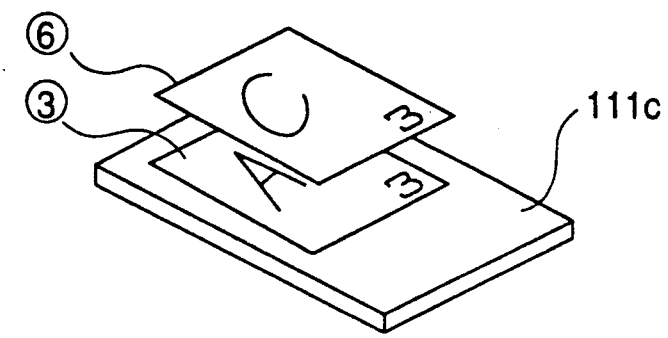

A first document has an image "A" formed thereon, and a second document has an image "C" formed thereon, as shown in FIG.24A. When the first document is set on the ADF, a first copied sheet on which the image "A" and an additional number "1" are formed is ejected to the first sorter bin 111a, a second copied sheet on which the image "A" and an incremented additional number "2" are formed is ejected to the second sorter bin 111b, and a third copied sheet on which the image "A" and a further incremented additional number "3" are formed is ejected to the third sorter bin 11c, as shown in FIGS.24B, 24C and 24D (①②③). After this, when the second document is set on the ADF, a fourth copied sheet on which the image "C" and the additional number "1" are formed is ejected to the first sorter bin 111a, a fifth copied sheet on which the image "C" and the additional number "2" are formed is ejected to the second sorter bin 111b, and a sixth copied sheet on which the image "C" and the additional number "3" are formed is ejected to the third sorter bin 111c, as shown in FIG.24A, 24B and 24c (④ ⑤ ⑥).

A value obtained by adding x to the initial data of the additional number and a value obtained by adding x to an initial value corresponding to the first sorter bin can be respectively stored in registers m and i, where x is an integer. The integer x is changed in every copy process. The operator can set the document directly on the copy machine without using the ADF.

Figure 20:
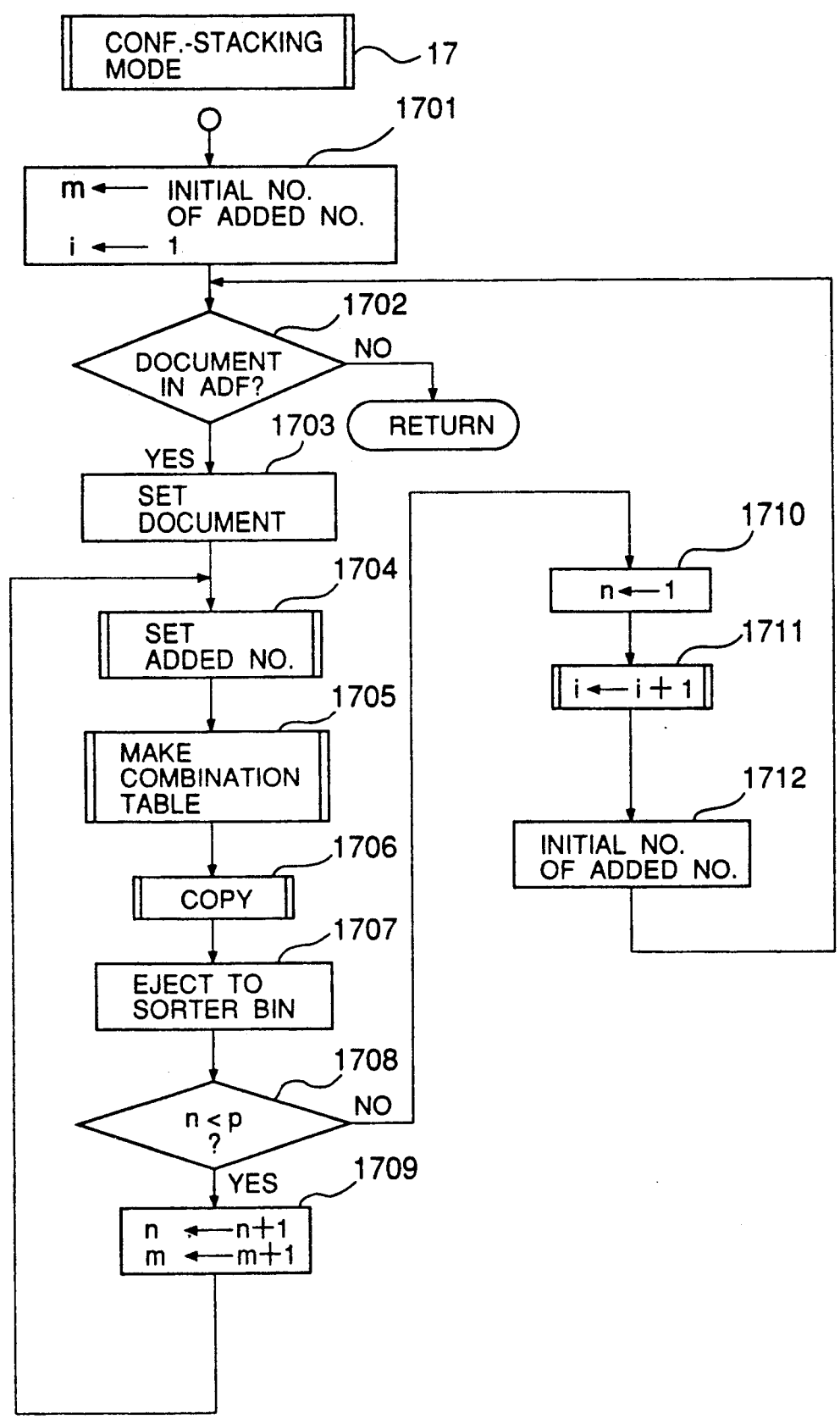
FIG.20 is a flow chart illustrating a process, shown in FIG.16, in a confidential-stacking copy mode.

The process in the confidential-stacking copy mode (step 17) is carried out in accordance with a flow chart shown in FIG.20.

Referring to FIG.20, the initial data of the additional number is set in the register m and an initial value "1" is set in the register i (step 1701). It is determined whether or not there is a document in the ADF (step 1702). When there is no document in the ADF, the process returns to the main program flow. When there is a document in the ADF, the document is set at the reading position (step 1703). An additional number to be printed on a copied sheet is set in the character code register (step 1704). The process for making the combination table shown in FIG.22 is carried out in the same manner as described above (step 1705). Then a copy process is carried out (step 1706), and a copied sheet is ejected to a sorter bin corresponding to the value in the register i (step 1707). After this, it is determined whether or not the number of copies has reached the total number of copies required by the operator (step 1708). When the number of copies has not reached the total number 35 required by the operator, the count value n of the number of copies and the character data m of the additional number are incremented by one (step 1709). Then the process returns to step 1704. Until the number of copies reaches the total number required by the operator, the above steps 1704 through 1709 are repeatedly carried out. As a result, the additional number which is set in the character code register and incremented one by one is superposed on an image signal corresponding to the reverse side of the document. Copied sheets successively ejected, in an increasing order of the additional number, to the sorter bin 111a corresponding to the value in the register i.

When it is determined that the number of copies has reached the total number required by the operator in step 1708, the count value n of the number of copies is reset to "1" (step 1710), the value in the register i is incremented by one (step 1711), and the character data m is reset to the initial value (step 1712). Then the process returns to step 1702. When there is a document in the ADF, the above steps 1702 through 1712 are repeated carried out. As a result, copied sheets are successively ejected, in an increasing order of the additional number, to the sorter bin 111b corresponding to the incremented value in the register i. Thus, copied sheets are successively stacked on each sorter bin in the increasing order of the additional number.

Figure 21:
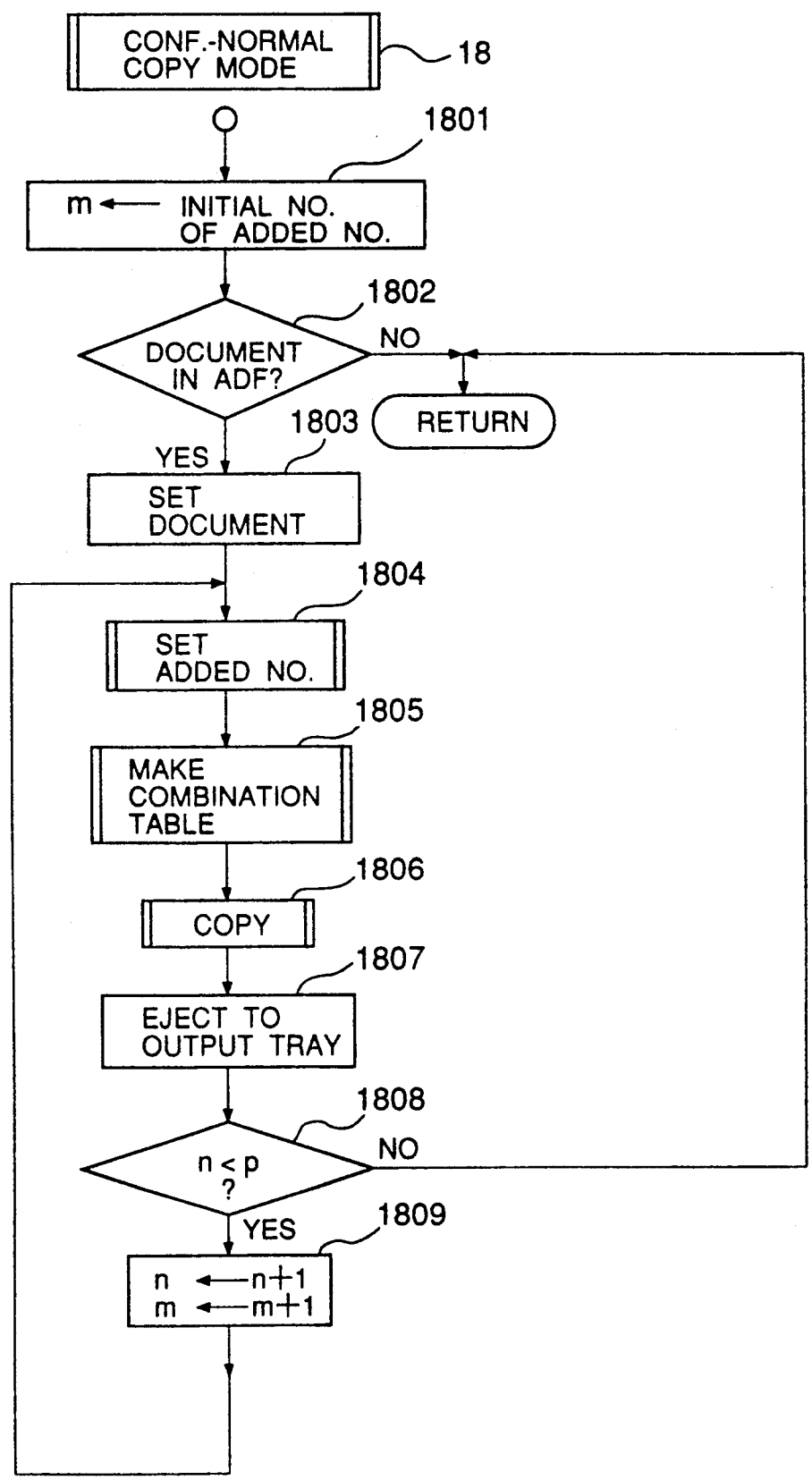
FIG.21 is a flow chart illustrating a process, shown in FIG.16, in a confidential-normal copy mode.

The process in the confidential-normal copy mode (step 18) is carried out in accordance with a flow chart shown in FIG.21.

Referring to FIG.21, the initial data of the additional number is set in the register m (step 1801). It is determined whether or not there is a document in the ADF (step 1802). When there is no document in the ADF, the process returns to the main program flow. When there is a document in the ADF, the document is set at the reading position (step 1803). An additional number to be printed on a copy paper is set in the character code register (step 1804). Then the process for making the combination table shown in FIG.22 is carried out in the same manner as described above (step 1805). A copy process is carried out (step 1806), and a copied sheet is ejected to an output tray (step 1807). Then it is determined whether or not the number of copies has reached the total number of copies required by the operator (step 1808). When the number of copies has not reached the total number required by the operator, the count value n of the number of copies and the character data m of the additional number are incremented by one (step 1809). Then the process returns to step 1804. Until the number of copies reaches the total number required by the operator, the above steps 1804 through 1809 are repeatedly carried out. When the number of copies reaches the total number required by the operator, the process returns to the main program flow. As a result, the additional number which is set in the character code register and incremented one by one is superposed on an image signal corresponding to the reverse side of the document. Copied papers successively ejected, in an increasing order of the additional number, to the output tray.

The present invention is not limited to the aforementioned embodiments, and variations and modification may be made without departing from the scope of the claimed invention.

What is claimed is:

1. An image forming apparatus, comprising:
   first image generating means for successively generating n first images, n being an integer;
   second image generating means for successively generating m second images different from each other, m being an integer equal to or greater than 2;
   image composition means, coupled to said first and second image generating means, for combining an i-th first image and a j-th second image with each other so as to output a composite image $I_{ij}$, wherein i varies from 1 to n and j varies from 1 to m, so that said image composition means forms n×m composite images;
   printing means, coupled to said image composition means, for printing said composite image $I_{ij}$ on a recording sheet; and
   output means, coupled to said printing means, for outputting the recording sheet having the composite image $I_{ij}$ formed thereon, and for classifying n×m recording sheets output by said output means into m sets based on the second images, each of m sets having n recording sheets.

2. An apparatus as claimed in claim 1, wherein said first image generating means comprises scanning means for successively scanning documents and for obtaining n images corresponding to the documents.

3. An apparatus as claimed in claim 1, wherein said second image generating means comprises character generating means for generating m character images as the m second images, the m character images being different from each other.

4. An apparatus as claimed in claim 3, wherein said character generating means comprises means for generating m numbers successively increasing one by one.

5. An apparatus as claimed in claim 1, wherein said printing means comprises duplex printing means for respectively printing composite images $I_{ij}$ and $I_{kj}$ on two sides of the recording sheet, k being different from i.

6. An apparatus as claimed in claim 5, wherein said duplex printing means comprises:
  first printing means for successively printing composite images in order from $I_{i1}$ to $I_{ij}$ on first sides of recording sheets;
  reversing means for successively reversing the recording sheets in order from a recording sheet having the composite images $I_{ij}$ to a recording sheet having a composite image $I_{i1}$; and
  second printing means for successively printing composite images in order from $I_{kj}$ to $I_{kl}$ on second sides of the recording sheets reversed by said reversing means.

7. An apparatus as claimed in claim 1, wherein said output means comprises:
  a sorter having at least m sorter bins; and
  sorting control means for controlling said sorter so that the recording sheet having the composite image $I_{ij}$ is ejected to a j-th sorter bin.

8. An apparatus as claimed in claim 1, wherein said output means comprises:
  a sorter having at least n sorter bins; and
  stacking control means for controlling said sorter so that the recording sheet having the composite image $I_{ij}$ is ejected to an i-th sorter bin.

9. An apparatus as claimed in claim 1, wherein said printing means comprises duplex printing means for respectively printing composite images $I_{ij}$ and $I_{kj}$ on two sides of the recording sheet, k being different from i, and wherein said output means comprises a sorter having at least m sorter bins, and sorting control means for controlling said sorter so that the recording sheet having the composite images $I_{ij}$ and $I_{kj}$ is ejected to a j-th sorter bin.

10. An apparatus as claimed in claim 1, further comprising:
  input means for inputting information regarding m destinations each of which should receive recording sheets having composite images;
  table generating means, coupled to said input means, for generating a combination table indicating the m second images corresponding to the m destinations based on the information input by said input means;
  storage means, coupled to said table generating means, for storing the combination table generated by said table generating means; and
  table output means, coupled to said storage means, for outputting the combination table stored in said storage means.

11. An apparatus as claimed in claim 10, wherein said table output means comprises table printing means for printing the combination table on a recording sheet.

* * * * *